United States Patent
Cp et al.

(10) Patent No.: US 10,205,743 B2
(45) Date of Patent: *Feb. 12, 2019

(54) AGENT ASSISTED MALICIOUS APPLICATION BLOCKING IN A NETWORK ENVIRONMENT

(71) Applicant: McAfee, LLC, Santa Clara, CA (US)

(72) Inventors: Chandan Cp, Bangalore (IN); Srinivasan Narasimhan, Bangalore (IN)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/399,091

(22) Filed: Jan. 5, 2017

(65) Prior Publication Data
US 2017/0118228 A1 Apr. 27, 2017

Related U.S. Application Data

(63) Continuation of application No. 14/127,395, filed as application No. PCT/US2013/066690 on Oct. 24, 2013, now Pat. No. 9,578,052.

(51) Int. Cl.
*H04L 29/06* (2006.01)
*G06F 21/55* (2013.01)
*G06F 21/56* (2013.01)

(52) U.S. Cl.
CPC .......... *H04L 63/145* (2013.01); *G06F 21/554* (2013.01); *G06F 21/566* (2013.01);
(Continued)

(58) Field of Classification Search
CPC ... H04L 63/145; H04L 63/0227; H04L 63/20; H04L 63/1408; G06F 21/566; G06F 21/554
(Continued)

(56) References Cited

U.S. PATENT DOCUMENTS 4,688,169 A 8/1987 Joshi
4,982,430 A 1/1991 Frezza et al.
(Continued)

FOREIGN PATENT DOCUMENTS

CN 1383295 A 12/2002
CN 101147379 3/2008
(Continued)

OTHER PUBLICATIONS

USPTO May 22, 2017 Notice of Allowance from U.S. Appl. No. 14/827,396, 35 pages.
(Continued)

*Primary Examiner* — Kambiz Zand
*Assistant Examiner* — Aubrey H Wyszynski
(74) *Attorney, Agent, or Firm* — Patent Capital Group

(57) ABSTRACT

Embodiments are configured to receive metadata of a process intercepted on an end host when attempting to access a network. The metadata includes a hash of an application associated with the process and an endpoint reputation score of the application. Embodiments are configured to request a threat intelligence reputation score based on the hash of the application, to determine an action to be taken by the end host based, at least in part, on one or more policies and at least one of the threat intelligence reputation score and the endpoint reputation score, and to send a response indicating the action to be taken by the end host. Further embodiments request another threat intelligence reputation score based on another hash of a dynamic link library module loaded by the process on the end host, and the action is determined based, at least in part, on the other threat intelligence score.

24 Claims, 11 Drawing Sheets

(52) U.S. Cl.
CPC .......... *H04L 63/1408* (2013.01); *H04L 63/20* (2013.01); *H04L 63/0227* (2013.01)

(58) Field of Classification Search
USPC .......................................................... 726/1
See application file for complete search history.

(56) References Cited

U.S. PATENT DOCUMENTS

| | | |
|---|---|---|
| 5,155,847 A | 10/1992 | Kirouac et al. |
| 5,222,134 A | 6/1993 | Waite et al. |
| 5,390,314 A | 2/1995 | Swanson |
| 5,521,849 A | 5/1996 | Adelson et al. |
| 5,560,008 A | 9/1996 | Johnson et al. |
| 5,699,513 A | 12/1997 | Feigen et al. |
| 5,778,226 A | 7/1998 | Adams et al. |
| 5,778,349 A | 7/1998 | Okonogi |
| 5,787,427 A | 7/1998 | Benantar et al. |
| 5,842,017 A | 11/1998 | Hookway et al. |
| 5,873,086 A | 2/1999 | Fujii et al. |
| 5,884,298 A | 3/1999 | Smith, II et al. |
| 5,907,709 A | 5/1999 | Cantey et al. |
| 5,907,860 A | 5/1999 | Garibay et al. |
| 5,926,832 A | 7/1999 | Wing et al. |
| 5,944,839 A | 8/1999 | Isenberg |
| 5,974,149 A | 10/1999 | Leppek |
| 5,987,557 A | 11/1999 | Ebrahim |
| 5,987,610 A | 11/1999 | Franczek et al. |
| 5,987,611 A | 11/1999 | Freund |
| 5,991,881 A | 11/1999 | Conklin et al. |
| 6,064,815 A | 5/2000 | Hohensee et al. |
| 6,073,142 A | 6/2000 | Geiger et al. |
| 6,141,698 A | 10/2000 | Krishnan et al. |
| 6,182,142 B1 | 1/2001 | Win et al. |
| 6,192,401 B1 | 2/2001 | Modiri et al. |
| 6,192,475 B1 | 2/2001 | Wallace |
| 6,256,773 B1 | 7/2001 | Bowman-Amuah |
| 6,275,938 B1 | 8/2001 | Bond et al. |
| 6,321,267 B1 | 11/2001 | Donaldson |
| 6,338,149 B1 | 1/2002 | Ciccone, Jr. et al. |
| 6,356,957 B2 | 3/2002 | Sanchez, II et al. |
| 6,377,808 B1 | 4/2002 | Korneluk et al. |
| 6,393,465 B2 | 5/2002 | Leeds |
| 6,442,686 B1 | 8/2002 | McArdle et al. |
| 6,449,040 B1 | 9/2002 | Fujita |
| 6,453,468 B1 | 9/2002 | D'Souza |
| 6,460,050 B1 | 10/2002 | Pace et al. |
| 6,496,477 B1 | 12/2002 | Perkins et al. |
| 6,587,877 B1 | 7/2003 | Douglis et al. |
| 6,611,925 B1 | 8/2003 | Spear |
| 6,658,645 B1 | 12/2003 | Akuta et al. |
| 6,662,219 B1 | 12/2003 | Nishanov et al. |
| 6,748,534 B1 | 6/2004 | Gryaznov et al. |
| 6,769,008 B1 | 7/2004 | Kumar et al. |
| 6,769,115 B1 | 7/2004 | Oldman |
| 6,772,345 B1 | 8/2004 | Shetty |
| 6,795,966 B1 | 9/2004 | Lim et al. |
| 6,832,227 B2 | 12/2004 | Seki et al. |
| 6,834,301 B1 | 12/2004 | Hanchett |
| 6,847,993 B1 | 1/2005 | Novaes et al. |
| 6,907,600 B2 | 6/2005 | Neiger et al. |
| 6,918,110 B2 | 7/2005 | Hundt et al. |
| 6,930,985 B1 | 8/2005 | Rathi et al. |
| 6,934,755 B1 | 8/2005 | Saulpaugh et al. |
| 6,941,470 B1 | 9/2005 | Jooste |
| 6,988,101 B2 | 1/2006 | Ham et al. |
| 6,988,124 B2 | 1/2006 | Douceur et al. |
| 7,007,302 B1 | 2/2006 | Jagger et al. |
| 7,010,796 B1 | 3/2006 | Strom et al. |
| 7,024,548 B1 | 4/2006 | O'Toole, Jr. |
| 7,039,949 B2 | 5/2006 | Cartmell et al. |
| 7,054,930 B1 | 5/2006 | Cheriton |
| 7,065,767 B2 | 6/2006 | Kambhammettu et al. |
| 7,069,330 B1 | 6/2006 | McArdle et al. |
| 7,082,456 B2 | 7/2006 | Mani-Meitav et al. |
| 7,093,239 B1 | 8/2006 | van der Made |
| 7,096,500 B2 | 8/2006 | Roberts et al. |
| 7,124,409 B2 | 10/2006 | Davis et al. |
| 7,139,916 B2 | 11/2006 | Billingsley et al. |
| 7,152,148 B2 | 12/2006 | Williams et al. |
| 7,159,036 B2 | 1/2007 | Hinchliffe et al. |
| 7,177,267 B2 | 2/2007 | Oliver et al. |
| 7,203,864 B2 | 4/2007 | Goin et al. |
| 7,251,655 B2 | 7/2007 | Kaler et al. |
| 7,290,266 B2 | 10/2007 | Gladstone et al. |
| 7,302,558 B2 | 11/2007 | Campbell et al. |
| 7,330,849 B2 | 2/2008 | Gerasoulis et al. |
| 7,340,684 B2 | 3/2008 | Ramamoorthy et al. |
| 7,346,781 B2 | 3/2008 | Cowle et al. |
| 7,349,931 B2 | 3/2008 | Horne |
| 7,350,204 B2 | 3/2008 | Lambert et al. |
| 7,353,501 B2 | 4/2008 | Tang et al. |
| 7,360,097 B2 | 4/2008 | Rothstein |
| 7,363,022 B2 | 4/2008 | Whelan et al. |
| 7,370,360 B2 | 5/2008 | van der Made |
| 7,385,938 B1 | 6/2008 | Beckett et al. |
| 7,406,517 B2 | 7/2008 | Hunt et al. |
| 7,406,603 B1 | 7/2008 | MacKay |
| 7,441,265 B2 | 10/2008 | Staamann et al. |
| 7,463,590 B2 | 12/2008 | Mualem et al. |
| 7,464,408 B1 | 12/2008 | Shah et al. |
| 7,506,155 B1 | 3/2009 | Stewart et al. |
| 7,506,170 B2 | 3/2009 | Finnegan |
| 7,506,364 B2 | 3/2009 | Vayman |
| 7,546,333 B2 | 6/2009 | Alon et al. |
| 7,546,594 B2 | 6/2009 | McGuire et al. |
| 7,552,479 B1 | 6/2009 | Conover et al. |
| 7,577,995 B2 | 8/2009 | Chebolu et al. |
| 7,603,552 B1 | 10/2009 | Sebes et al. |
| 7,607,170 B2 | 10/2009 | Chesla |
| 7,657,599 B2 | 2/2010 | Smith |
| 7,669,195 B1 | 2/2010 | Qumei |
| 7,685,632 B2 | 3/2010 | Vayman |
| 7,685,635 B2 | 3/2010 | Vega et al. |
| 7,694,150 B1 | 4/2010 | Kirby |
| 7,698,744 B2 | 4/2010 | Fanton et al. |
| 7,703,090 B2 | 4/2010 | Napier et al. |
| 7,757,269 B1 | 7/2010 | Roy-Chowdhury et al. |
| 7,765,538 B2 | 7/2010 | Zweifel et al. |
| 7,783,735 B1 | 8/2010 | Sebes et al. |
| 7,809,704 B2 | 10/2010 | Surendran et al. |
| 7,814,554 B1 | 10/2010 | Ragner |
| 7,818,377 B2 | 10/2010 | Whitney et al. |
| 7,823,148 B2 | 10/2010 | Deshpande et al. |
| 7,836,504 B2 | 11/2010 | Ray et al. |
| 7,840,968 B1 | 11/2010 | Sharma et al. |
| 7,849,507 B1 | 12/2010 | Bloch et al. |
| 7,853,643 B1 | 12/2010 | Martinez et al. |
| 7,856,661 B1 | 12/2010 | Sebes et al. |
| 7,865,931 B1 | 1/2011 | Stone et al. |
| 7,870,387 B1 | 1/2011 | Bhargava et al. |
| 7,873,955 B1 | 1/2011 | Sebes et al. |
| 7,895,573 B1 | 2/2011 | Bhargava et al. |
| 7,908,653 B2 | 3/2011 | Brickell et al. |
| 7,925,722 B1 | 4/2011 | Reed et al. |
| 7,937,455 B2 | 5/2011 | Saha et al. |
| 7,950,056 B1 | 5/2011 | Satish et al. |
| 7,966,659 B1 | 6/2011 | Wilkinson et al. |
| 7,996,836 B1 | 8/2011 | McCorkendale et al. |
| 8,015,388 B1 | 9/2011 | Rihan et al. |
| 8,015,563 B2 | 9/2011 | Araujo et al. |
| 8,028,340 B2 | 9/2011 | Sebes et al. |
| 8,055,904 B1 | 11/2011 | Cato et al. |
| 8,099,060 B2 | 1/2012 | Kirkup et al. |
| 8,136,143 B2 | 3/2012 | Hannel et al. |
| 8,166,474 B1 | 4/2012 | Delco et al. |
| 8,195,931 B1 | 6/2012 | Sharma et al. |
| 8,205,188 B2 | 6/2012 | Ramamoorthy et al. |
| 8,209,680 B1 | 6/2012 | Le et al. |
| 8,234,709 B2 | 7/2012 | Viljoen et al. |
| 8,234,713 B2 | 7/2012 | Roy-Chowdhury et al. |
| 8,307,437 B2 | 11/2012 | Sebes et al. |
| 8,321,932 B2 | 11/2012 | Bhargava et al. |
| 8,332,929 B1 | 12/2012 | Bhargava et al. |
| 8,352,930 B1 | 1/2013 | Sebes et al. |

(56) References Cited

U.S. PATENT DOCUMENTS

| | | |
|---|---|---|
| 8,381,284 B2 | 2/2013 | Dang et al. |
| 8,387,046 B1 | 2/2013 | Montague et al. |
| 8,515,075 B1 | 8/2013 | Saraf et al. |
| 8,539,063 B1 | 9/2013 | Sharma et al. |
| 8,544,003 B1 | 9/2013 | Sawhney et al. |
| 8,549,003 B1 | 10/2013 | Bhargava et al. |
| 8,549,546 B2 | 10/2013 | Sharma et al. |
| 8,555,404 B1 | 10/2013 | Sebes et al. |
| 8,561,051 B2 | 10/2013 | Sebes et al. |
| 8,561,082 B2 | 10/2013 | Sharma et al. |
| 8,584,199 B1 | 11/2013 | Chen et al. |
| 8,701,182 B2 | 4/2014 | Bhargava et al. |
| 8,707,422 B2 | 4/2014 | Bhargava et al. |
| 8,707,446 B2 | 4/2014 | Roy-Chowdhury et al. |
| 8,713,668 B2 | 4/2014 | Cooper et al. |
| 8,726,391 B1 | 5/2014 | Zhong et al. |
| 8,739,272 B1 | 5/2014 | Cooper et al. |
| 8,762,928 B2 | 6/2014 | Sharma et al. |
| 8,763,118 B2 | 6/2014 | Sebes et al. |
| 8,793,489 B2 | 7/2014 | Polunin et al. |
| 8,800,024 B2 | 8/2014 | Cooper et al. |
| 8,843,903 B1 | 9/2014 | Blaser et al. |
| 8,869,265 B2 | 10/2014 | Dang et al. |
| 8,875,292 B1 | 10/2014 | Bogorad et al. |
| 8,904,520 B1 | 12/2014 | Nachenberg et al. |
| 8,925,101 B2 | 12/2014 | Bhargava et al. |
| 8,938,800 B2 | 1/2015 | Bhargava et al. |
| 8,973,146 B2 | 3/2015 | Ramanan et al. |
| 9,112,830 B2 | 8/2015 | Cooper et al. |
| 9,134,998 B2 | 9/2015 | Roy-Chowdhury et al. |
| 9,356,909 B2 | 5/2016 | Cooper et al. |
| 9,413,785 B2 | 8/2016 | Cooper et al. |
| 9,424,154 B2 | 8/2016 | Bhargava et al. |
| 9,467,470 B2 | 10/2016 | Bhargava et al. |
| 9,576,142 B2 | 2/2017 | Bhargava et al. |
| 9,578,052 B2 | 2/2017 | CP et al. |
| 9,594,881 B2 | 3/2017 | Bhargava et al. |
| 9,602,515 B2 | 3/2017 | Roy-Chowdhury et al. |
| 2002/0056076 A1 | 5/2002 | van der Made |
| 2002/0069367 A1 | 6/2002 | Tindal et al. |
| 2002/0083175 A1 | 6/2002 | Afek et al. |
| 2002/0099671 A1 | 7/2002 | Mastin Crosbie et al. |
| 2002/0114319 A1 | 8/2002 | Liu et al. |
| 2002/0118644 A1 | 8/2002 | Moir |
| 2002/0133586 A1 | 9/2002 | Shanklin et al. |
| 2003/0014667 A1 | 1/2003 | Kolichtchak |
| 2003/0023736 A1 | 1/2003 | Abkemeier |
| 2003/0033510 A1 | 2/2003 | Dice |
| 2003/0061506 A1 | 3/2003 | Cooper et al. |
| 2003/0065945 A1 | 4/2003 | Lingafelt et al. |
| 2003/0073894 A1 | 4/2003 | Chiang et al. |
| 2003/0074552 A1 | 4/2003 | Olkin et al. |
| 2003/0088680 A1 | 5/2003 | Nachenberg et al. |
| 2003/0115222 A1 | 6/2003 | Oashi et al. |
| 2003/0120601 A1 | 6/2003 | Ouye et al. |
| 2003/0120811 A1 | 6/2003 | Hanson et al. |
| 2003/0120935 A1 | 6/2003 | Teal et al. |
| 2003/0140210 A1* | 7/2003 | Testardi ............... G06F 3/0601 711/203 |
| 2003/0145232 A1 | 7/2003 | Poletto et al. |
| 2003/0163718 A1 | 8/2003 | Johnson et al. |
| 2003/0167292 A1 | 9/2003 | Ross |
| 2003/0167399 A1 | 9/2003 | Audebert et al. |
| 2003/0200332 A1 | 10/2003 | Gupta et al. |
| 2003/0212902 A1 | 11/2003 | van der Made |
| 2003/0220944 A1 | 11/2003 | Schottland et al. |
| 2003/0221190 A1 | 11/2003 | Deshpande et al. |
| 2004/0003258 A1 | 1/2004 | Billingsley et al. |
| 2004/0015554 A1 | 1/2004 | Wilson |
| 2004/0051736 A1 | 3/2004 | Daniell |
| 2004/0054928 A1 | 3/2004 | Hall |
| 2004/0057454 A1 | 3/2004 | Hennegan et al. |
| 2004/0088398 A1 | 5/2004 | Barlow |
| 2004/0139206 A1 | 7/2004 | Claudatos et al. |
| 2004/0143749 A1 | 7/2004 | Tajali et al. |
| 2004/0153650 A1 | 8/2004 | Hillmer |
| 2004/0167906 A1 | 8/2004 | Smith et al. |
| 2004/0172551 A1 | 9/2004 | Fielding et al. |
| 2004/0230963 A1 | 11/2004 | Rothman et al. |
| 2004/0243678 A1 | 12/2004 | Smith et al. |
| 2004/0255161 A1 | 12/2004 | Cavanaugh |
| 2004/0268149 A1 | 12/2004 | Aaron |
| 2005/0005006 A1 | 1/2005 | Chauffour et al. |
| 2005/0018651 A1 | 1/2005 | Yan et al. |
| 2005/0022014 A1 | 1/2005 | Shipman |
| 2005/0050336 A1 | 3/2005 | Liang et al. |
| 2005/0071633 A1 | 3/2005 | Rothstein |
| 2005/0081053 A1 | 4/2005 | Aston et al. |
| 2005/0086047 A1 | 4/2005 | Uchimoto et al. |
| 2005/0091321 A1 | 4/2005 | Daniell et al. |
| 2005/0091487 A1 | 4/2005 | Cross et al. |
| 2005/0108516 A1 | 5/2005 | Balzer et al. |
| 2005/0108562 A1 | 5/2005 | Khazan et al. |
| 2005/0114672 A1 | 5/2005 | Duncan et al. |
| 2005/0132346 A1 | 6/2005 | Tsantilis |
| 2005/0198519 A1 | 9/2005 | Tamura et al. |
| 2005/0228990 A1 | 10/2005 | Kato et al. |
| 2005/0235360 A1 | 10/2005 | Pearson |
| 2005/0256907 A1 | 11/2005 | Novik et al. |
| 2005/0257207 A1 | 11/2005 | Blumfield et al. |
| 2005/0257265 A1 | 11/2005 | Cook et al. |
| 2005/0260996 A1 | 11/2005 | Groenendaal |
| 2005/0262558 A1 | 11/2005 | Usov |
| 2005/0273858 A1 | 12/2005 | Zadok et al. |
| 2005/0278784 A1 | 12/2005 | Gupta et al. |
| 2005/0283823 A1 | 12/2005 | Okajo et al. |
| 2005/0289538 A1 | 12/2005 | Black-Ziegelbein et al. |
| 2006/0004875 A1 | 1/2006 | Baron et al. |
| 2006/0015501 A1 | 1/2006 | Sanamrad et al. |
| 2006/0037016 A1 | 2/2006 | Saha et al. |
| 2006/0072451 A1 | 4/2006 | Ross |
| 2006/0075299 A1 | 4/2006 | Chandramouleeswaran et al. |
| 2006/0075478 A1 | 4/2006 | Hyndman et al. |
| 2006/0080656 A1 | 4/2006 | Cain et al. |
| 2006/0085785 A1 | 4/2006 | Garrett |
| 2006/0101277 A1 | 5/2006 | Meenan et al. |
| 2006/0133223 A1 | 6/2006 | Nakamura et al. |
| 2006/0136910 A1 | 6/2006 | Brickell et al. |
| 2006/0136911 A1 | 6/2006 | Robinson et al. |
| 2006/0143713 A1 | 6/2006 | Challener et al. |
| 2006/0168213 A1 | 7/2006 | Richardson et al. |
| 2006/0195906 A1 | 8/2006 | Jin et al. |
| 2006/0200863 A1 | 9/2006 | Ray et al. |
| 2006/0230314 A1 | 10/2006 | Sanjar et al. |
| 2006/0236398 A1 | 10/2006 | Trakic et al. |
| 2006/0259734 A1 | 11/2006 | Sheu et al. |
| 2006/0277603 A1 | 12/2006 | Kelso et al. |
| 2007/0011746 A1 | 1/2007 | Malpani et al. |
| 2007/0028303 A1 | 2/2007 | Brennan |
| 2007/0033645 A1 | 2/2007 | Jones |
| 2007/0039049 A1 | 2/2007 | Kupferman et al. |
| 2007/0050579 A1 | 3/2007 | Hall et al. |
| 2007/0050764 A1 | 3/2007 | Traut |
| 2007/0074199 A1 | 3/2007 | Schoenberg |
| 2007/0083522 A1 | 4/2007 | Nord et al. |
| 2007/0101435 A1 | 5/2007 | Konanka et al. |
| 2007/0136579 A1 | 6/2007 | Levy et al. |
| 2007/0143851 A1 | 6/2007 | Nicodemus et al. |
| 2007/0157303 A1 | 7/2007 | Pankratov |
| 2007/0168861 A1 | 7/2007 | Bell et al. |
| 2007/0169079 A1 | 7/2007 | Keller et al. |
| 2007/0192329 A1 | 8/2007 | Croft et al. |
| 2007/0214504 A1 | 9/2007 | Milani Comparetti et al. |
| 2007/0220061 A1 | 9/2007 | Tirosh et al. |
| 2007/0220507 A1 | 9/2007 | Back et al. |
| 2007/0232265 A1 | 10/2007 | Park et al. |
| 2007/0253430 A1 | 11/2007 | Minami et al. |
| 2007/0256138 A1 | 11/2007 | Gadea et al. |
| 2007/0271561 A1 | 11/2007 | Winner et al. |
| 2007/0276950 A1 | 11/2007 | Dadhia |
| 2007/0297333 A1 | 12/2007 | Zuk et al. |
| 2007/0297396 A1 | 12/2007 | Eldar et al. |
| 2007/0300215 A1 | 12/2007 | Bardsley |
| 2008/0005737 A1 | 1/2008 | Saha et al. |

(56) References Cited

U.S. PATENT DOCUMENTS

| | | |
|---|---|---|
| 2008/0005798 A1 | 1/2008 | Ross |
| 2008/0010304 A1 | 1/2008 | Vempala et al. |
| 2008/0022384 A1 | 1/2008 | Yee et al. |
| 2008/0034416 A1 | 2/2008 | Kumar et al. |
| 2008/0034418 A1 | 2/2008 | Venkatraman et al. |
| 2008/0052468 A1 | 2/2008 | Speirs et al. |
| 2008/0059123 A1 | 3/2008 | Estberg et al. |
| 2008/0082662 A1 | 4/2008 | Dandliker et al. |
| 2008/0082977 A1 | 4/2008 | Araujo et al. |
| 2008/0086513 A1 | 4/2008 | O'Brien |
| 2008/0115012 A1 | 5/2008 | Jann et al. |
| 2008/0120499 A1 | 5/2008 | Zimmer et al. |
| 2008/0141371 A1 | 6/2008 | Bradicich et al. |
| 2008/0155336 A1 | 6/2008 | Joshi et al. |
| 2008/0163207 A1 | 7/2008 | Reumann et al. |
| 2008/0163210 A1 | 7/2008 | Bowman et al. |
| 2008/0165952 A1 | 7/2008 | Smith et al. |
| 2008/0184373 A1 | 7/2008 | Traut et al. |
| 2008/0235534 A1 | 9/2008 | Schunter et al. |
| 2008/0282080 A1 | 11/2008 | Hyndman et al. |
| 2008/0294703 A1 | 11/2008 | Craft et al. |
| 2008/0295173 A1 | 11/2008 | Tsvetanov |
| 2008/0301770 A1 | 12/2008 | Kinder |
| 2008/0307524 A1 | 12/2008 | Singh et al. |
| 2009/0007100 A1 | 1/2009 | Field et al. |
| 2009/0038017 A1 | 2/2009 | Durham et al. |
| 2009/0043993 A1 | 2/2009 | Ford et al. |
| 2009/0049172 A1 | 2/2009 | Miller |
| 2009/0055693 A1 | 2/2009 | Budko et al. |
| 2009/0063665 A1 | 3/2009 | Bagepalli et al. |
| 2009/0113110 A1 | 4/2009 | Chen et al. |
| 2009/0144300 A1 | 6/2009 | Chatley et al. |
| 2009/0150639 A1 | 6/2009 | Ohata |
| 2009/0158430 A1 | 6/2009 | Borders |
| 2009/0178110 A1 | 7/2009 | Higuchi |
| 2009/0220080 A1 | 9/2009 | Herne et al. |
| 2009/0249053 A1 | 10/2009 | Zimmer et al. |
| 2009/0249438 A1 | 10/2009 | Litvin et al. |
| 2009/0320010 A1 | 12/2009 | Chow et al. |
| 2009/0320133 A1 | 12/2009 | Viljoen et al. |
| 2009/0320140 A1 | 12/2009 | Sebes et al. |
| 2009/0328144 A1 | 12/2009 | Sherlock et al. |
| 2009/0328185 A1 | 12/2009 | van den Berg et al. |
| 2010/0049973 A1 | 2/2010 | Chen |
| 2010/0071035 A1 | 3/2010 | Budko et al. |
| 2010/0100970 A1 | 4/2010 | Roy-Chowdhury et al. |
| 2010/0114825 A1 | 5/2010 | Siddegowda |
| 2010/0138430 A1 | 6/2010 | Gotou |
| 2010/0188976 A1 | 7/2010 | Rahman et al. |
| 2010/0250895 A1 | 9/2010 | Adams et al. |
| 2010/0281133 A1 | 11/2010 | Brendel |
| 2010/0293225 A1 | 11/2010 | Sebes et al. |
| 2010/0299277 A1 | 11/2010 | Emelo et al. |
| 2010/0332910 A1 | 12/2010 | Ali et al. |
| 2011/0029772 A1 | 2/2011 | Fanton et al. |
| 2011/0035423 A1 | 2/2011 | Kobayashi et al. |
| 2011/0047542 A1 | 2/2011 | Dang et al. |
| 2011/0047543 A1 | 2/2011 | Mohinder |
| 2011/0060845 A1 | 3/2011 | Jungck |
| 2011/0061092 A1 | 3/2011 | Bailloeul et al. |
| 2011/0077948 A1 | 3/2011 | Sharma et al. |
| 2011/0078550 A1 | 3/2011 | Nabutovsky |
| 2011/0093842 A1 | 4/2011 | Sebes |
| 2011/0093950 A1 | 4/2011 | Bhargava et al. |
| 2011/0113467 A1 | 5/2011 | Agarwal et al. |
| 2011/0119760 A1 | 5/2011 | Sebes et al. |
| 2011/0138461 A1 | 6/2011 | Bhargava et al. |
| 2011/0246753 A1 | 10/2011 | Thomas |
| 2011/0302647 A1 | 12/2011 | Bhattacharya et al. |
| 2012/0030731 A1 | 2/2012 | Bhargava et al. |
| 2012/0030750 A1 | 2/2012 | Bhargava et al. |
| 2012/0110666 A1 | 5/2012 | Ogilvie |
| 2012/0159631 A1 | 6/2012 | Niemela et al. |
| 2012/0216271 A1 | 8/2012 | Cooper et al. |
| 2012/0233611 A1 | 9/2012 | Voccio |
| 2012/0272318 A1 | 10/2012 | Doukhvalov |
| 2012/0278853 A1 | 11/2012 | Roy-Chowdhury et al. |
| 2012/0290827 A1 | 11/2012 | Bhargava et al. |
| 2012/0290828 A1 | 11/2012 | Bhargava et al. |
| 2012/0297176 A1 | 11/2012 | Bhargava et al. |
| 2013/0024934 A1 | 1/2013 | Sebes et al. |
| 2013/0091318 A1 | 4/2013 | Bhattacharjee et al. |
| 2013/0097355 A1 | 4/2013 | Dang et al. |
| 2013/0097356 A1 | 4/2013 | Dang et al. |
| 2013/0097658 A1 | 4/2013 | Cooper et al. |
| 2013/0097692 A1 | 4/2013 | Cooper et al. |
| 2013/0117823 A1 | 5/2013 | Dang et al. |
| 2013/0179971 A1 | 7/2013 | Harrison |
| 2013/0227683 A1 | 8/2013 | Bettini et al. |
| 2013/0246044 A1 | 9/2013 | Sharma et al. |
| 2013/0246393 A1 | 9/2013 | Saraf et al. |
| 2013/0246423 A1 | 9/2013 | Bhargava et al. |
| 2013/0246685 A1 | 9/2013 | Bhargava et al. |
| 2013/0247016 A1 | 9/2013 | Sharma et al. |
| 2013/0247027 A1 | 9/2013 | Shah et al. |
| 2013/0247032 A1 | 9/2013 | Bhargava et al. |
| 2013/0247181 A1 | 9/2013 | Saraf et al. |
| 2013/0247192 A1 | 9/2013 | Krasser et al. |
| 2013/0247201 A1* | 9/2013 | Alperovitch ............ H04L 63/14 726/24 |
| 2013/0247226 A1 | 9/2013 | Sebes et al. |
| 2013/0268994 A1 | 10/2013 | Cooper et al. |
| 2014/0090061 A1 | 3/2014 | Avasarala et al. |
| 2014/0101783 A1 | 4/2014 | Bhargava et al. |
| 2014/0189859 A1 | 7/2014 | Ramanan et al. |
| 2014/0237584 A1 | 8/2014 | Cooper et al. |
| 2014/0250492 A1 | 9/2014 | Cooper et al. |
| 2014/0283065 A1 | 9/2014 | Teddy et al. |
| 2014/0283066 A1 | 9/2014 | Teddy et al. |
| 2014/0317592 A1 | 10/2014 | Roy-Chowdhury et al. |
| 2014/0351895 A1 | 11/2014 | Bhargava et al. |
| 2015/0121449 A1 | 4/2015 | CP |
| 2015/0180884 A1 | 6/2015 | Bhargava et al. |
| 2015/0180997 A1 | 6/2015 | Ramanan et al. |
| 2015/0200968 A1 | 7/2015 | Bhargava et al. |
| 2015/0365380 A1 | 12/2015 | Cooper et al. |
| 2016/0105444 A1 | 4/2016 | Roy-Chowdhury et al. |
| 2016/0352683 A1 | 12/2016 | Cooper et al. |
| 2017/0140168 A1 | 5/2017 | Bhargava et al. |
| 2017/0374030 A1 | 12/2017 | Cooper et al. |

FOREIGN PATENT DOCUMENTS

| | | |
|---|---|---|
| CN | 101218568 A | 7/2008 |
| CN | 101569129 | 10/2009 |
| CN | 101636998 A | 1/2010 |
| CN | 103283202 A | 9/2013 |
| EP | 1 482 394 A2 | 12/2004 |
| EP | 2 037 657 A1 | 3/2009 |
| EP | 2599026 | 6/2013 |
| EP | 2599276 | 6/2013 |
| JP | 2004/524598 A | 8/2004 |
| JP | 2004-078507 A | 11/2004 |
| JP | 2005-275839 | 6/2005 |
| JP | 2005-202523 | 7/2005 |
| JP | 2006-59217 | 3/2006 |
| JP | 2006-270894 A | 5/2006 |
| JP | 2006-302292 | 11/2006 |
| JP | 2007-500396 | 1/2007 |
| JP | 2008-506303 | 2/2008 |
| JP | 2008-217306 | 9/2008 |
| JP | 2008-546060 A | 12/2008 |
| JP | 2009-510858 | 3/2009 |
| JP | 2010-16834 | 1/2010 |
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2007/016478 A2 | 2/2007 |
| WO | WO 2008/054997 A2 | 5/2008 |
| WO | WO 2011/003958 A1 | 1/2011 |
| WO | WO 2011/059877 | 5/2011 |
| WO | WO 2012/015485 | 2/2012 |
| WO | WO 2012/015489 | 2/2012 |

(56) References Cited

FOREIGN PATENT DOCUMENTS

| WO | WO 2012/116098 | | 8/2012 |
|---|---|---|---|
| WO | WO 2013/058940 | | 4/2013 |
| WO | WO 2013/058944 | | 4/2013 |
| WO | WO 2014/105308 | A1 | 7/2014 |
| WO | WO 2015/060857 | A1 | 4/2015 |

OTHER PUBLICATIONS

"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
Barrantes et al., "Randomized Instruction Set Emulation to Dispurt Binary Code Injection Attacks," Oct. 27-31, 2003, ACM, pp. 281-289.
Gaurav et al., "Countering Code-Injection Attacks with Instruction-Set Randomization," Oct. 27-31, 2003, ACM, pp. 272-280.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Notification of Transmittal of the International Search Report and the Written Opinion of the International Searching Authority (1 page), International Search Report (4 pages), and Written Opinion (3 pages), dated Mar. 2, 2011, International Application No. PCT/US2010/055520.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 dated Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 dated Jul. 14, 2011.
Tal Garfinkel, et al., "Terra: A Virtual Machine-Based Platform for Trusted Computing," XP-002340992, SOSP'03, Oct. 19-22, 2003, 14 pages.
IA-32 Intel® Architecture Software Developer's Manual, vol. 3B; Jun. 2006; pp. 13, 15, 22 and 145-146.
Notification of International Preliminary Report on Patentability and Written Opinion dated May 24, 2012 for International Application No. PCT/US2010/055520, 5 pages.
Sailer et al., sHype: Secure Hypervisor Approach to Trusted Virtualized Systems, IBM research Report, Feb. 2, 2005, 13 pages.
Kurt Gutzmann, "Access Control and Session Management in the HTTP Environment," Jan./Feb. 2001, pp. 26-35, IEEE Internet Computing.
"Apache Hadoop Project," http://hadoop.apache.org/, retrieved and printed Jan. 26, 2011, 3 pages.
"Cbl, composite blocking list," http://cbl.abuseat.org, retrieved and printed Jan. 26, 2011, 8 pages.
A Tutorial on Clustering Algorithms, retrieved Sep. 10, 2010 from http://home.dei.polimi.it/matteucc/clustering/tutorial.html, 6 pages.
A. Pitsillidis, K. Levchenko, C. Kreibich, C. Kanich, G.M. Voelker, V. Pason, N. Weaver, and S. Savage, "Botnet Judo: Fighting Spam with Itself," in Proceedings of the 17th Annual Network and Distributed System Security Symposium (NDSS'10), Feb. 2010, 19 pages.
A. Ramachandran, N. Feamster, and D. Dagon, "Revealing botnet membership using DNSBL counter-intelligence," in Proceedings of the 2nd USENIX Steps to Reducing Unwanted Traffic on the Internet, 2006, 6 pages.
A. Ramachandran, N. Feamster, and S. Vempala, "Filtering Spam with Behavioral Blacklisting," in *Proceedings of ACM Conference on Computer Communications Security*, 2007, 10 pages.
B. Stone-Gross, M. Cova, L. Cavallor, B. Gilbert, M. Szydlowski, R. Kemmerer, C. Kruegel, and G. Vigna, "Your Botnet is My Botnet: Analysis of a Botnet Takeover," in Proceedings of the 16th ACM Conference on Computer and Communicatinos Security, 2009, 13 pages.
C. Kanich, C. Kreibich, K. Levchenko, B. Enright, G.M. Voelker, V. Paxson, and S. Savage, "Spamalytics: An Empirical Analysis of Spam Marketing Conversion," in Proceedings of the 15th ACM conference on Computer and Communications Security, 2008, 12 pages.
C.J. Burges, "A Tutorial on Support Vector Machines for Pattern Recognition," in *Journal of Data Mining and Knowledge Discovery*, 1998, 43 pages.
E-Mail Spamming Botnets: Signatures and Characteristics, Posted Sep. 22, 2008, http://www.protofilter.com/blog/email-spam-botnets-signatures.html, retrieved and printed Feb. 2, 2011, 4 pages.
G. Gu, J. Zhang, and W. Lee, "BotSniffer: Detecting Botnet Command and Control Channels in Network Traffic," in Proceedings of the 15th Annual Network and Distributed System Security Symposium (NDSS'08), Feb. 2008, 24 pages.
G. Gu, P. Porras, V. Yegneswaran, M. Fong, and W. Lee, "BotHunter: Detecting Malware Infection Through IDS-Driven Dialog Correlation," in Proceedings of the 16th USNIX Security Symposium, 2007, 34 pages.
G. Gu, R. Perdisci, J. Zhang, and W. Lee, "BotMiner: Clustering Analysis of Network Traffic for Protocol and Structure-Independent Botnet Detection," in Proceedings of the 17th USENIX Security Symposium, 2008, 15 pages.
I. Jolliffe, "Principal Component Analysis," in *Springer Series in Statistics, Statistical Theory and Methods, 2nd ed.*), 2002, 518 pages.
J. Dean and S. Ghemawat, "MapReduce: Simplified Data Processing on Large Clusters," in *Proceedings of Sixth Symposium on Operating System Design and Implementation, OSDI*, 2004, 13 pages.
J. Goebel and T. Holz, "Rishi: Identify Bot Contaminated Hosts by IRC Nickname Evaluation," in *Proceedings of the USENIX HotBots*, 2007, 12 pages.
J.B. Grizzard, V. Sharma, C. Nunnery, B.B. Kang, and D. Dagon, "Peer-to-Peer Botnets: Overview and Case Study," in Proceedings of the 1st Workshop on Hot Topics in Understanding Botnets, Apr. 2007, 14 pages.
J.P. John, A. Moshchuk, S.D. Gribble, and A. Krishnamurthy, "Studying Spamming Botnets Using Botlab," in Proceedings of the 6th USENIX Symposium on Networked Systems Design and Implementation, 2009, 16 pages.
K. Li, Z. Zhong, and L. Ramaswamy, "Privacy-Aware Collaborative Spam Filtering," in *Journal of IEEE Transactions on Parallel and Distributed Systems*, vol. 29, No. 5, May 2009, pp. 725-739.
L. Zhuang, J. Dunagan, D.R. Simon, H.J. Wang, and J.D. Tygar, "Characterizing botnets from email spam records," in Proceedings of the 1st Usenix Workshop on Large-Scale Exploits and Emergent Threats), 2008, 18 pages.
M. Frigo and S.G. Johnson, "The Design and Implementation of FFTW3," in Proceedings of the IEEE 93(2), Invited paper, Special Issue on Program Generation, Optimization, and Platform Adaptation, 2005, 16 pages.
R. Perdisci, I. Corona, D. Dagon, and W. Lee, "Detecting Malicious Flux Service Networks through Passive Analysis of Recursive Dns Traces," in Proceedings of the 25th Annual Computer Security Applications Conference (ACSAC 2009), Dec. 2009, 10 pages.
X. Jiang, D. Xu, and Y.-M. Wang, "Collapsar: A VM-Based Honeyfarm and Reverse Honeyfarm Architecture for Network Attack Capture

(56) References Cited

OTHER PUBLICATIONS and Detention," in Journal of Parallel and Distributed Computing, Special Issue on Security in Grid and Distributed Systems, 2006, 16 pages.
Y. Tang, S. Krasser, P. Judge, and Y.-Q. Zhang, "Fast and Effective Spam Sender Detection with Granular SVM on Highly Imbalanced Mail Server Behavior Data," in Proceedings of 2nd International Conference on Collaborative Computing: Networking, Applications and Worksharing (CollaborativeCom), Nov. 2006, 6 pages.
Y. Zhao, Y. Xie, F. Yu, Q. Ke, Y. Yu, Y. Chen, and E. Gillum, "BotGraph: Large Scale Spamming Botnet Detection," in Proceedings of the 6th USENIX Symposium on Networked Systems Design and Implementation, 2009, 26 pages.
Yinglian Xie, Fang Yu, Kannan Achan, Rina Panigraphy, Geoff Hulten, and Ivan Osipkov, "Spamming Botnets: Signatures and Characteristics," SIGCOMM '08, Aug. 17, 22, 2008, http://ccr.sigcomm.org/online/files/p171-xie.pdf, pp. 171-182.
Z. Li, A. Goyal, Y. Chen, and V. Paxson, "Automating Analysis of Large-Scale Botnet probing Events," in Proceedings of ACM Symposium on Information, Computer and Communications Security (ASIACCS)), 2009, 12 pages.
Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.
G. Pruett et al., "BladeCenter systems management software", [Online], Nov. 2005, pp. 963-975, [Retrieved from Internet on Oct. 24, 2012], <http://citeseerx.lst.psu.edu/viewdoc/download?doi=10.1.1.91.5091&rep=rep1&type=pdf>.
Philip M. Papadopoulos et al., "NPACI Rocks: tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.
Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.
"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.
"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.
Rivest, R., "The MD5 Message-Digest Algorithm", RFC 1321, Apr. 1992, retrieved on Dec. 14, 2012 from http://www.ietf.org/rfc/rfc1321.txt, 21 pages.
Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.
"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.
An Analysis of Address Space Layout Randomization on Windows Vista™, Symantec Advanced Threat Research, copyright 2007 Symantec Corporation, available at http://www.symantec.com/avcenter/reference/Address_Space_Layout_Randomization.pdf, 19 pages.
Bhatkar, et al., "Efficient Techniques for Comprehensive Protection from Memory Error Exploits," USENIX Association, 14th USENIX Security Symposium, Aug. 1-5, 2005, Baltimore, MD, 16 pages.
Dewan, et al., "A Hypervisor-Based System for Protecting Software Runtime Memory and Persistent Storage," Spring Simulation Multiconference 2008, Apr. 14-17, 2008, Ottawa, Canada, (available at website: www.vodun.org/papers/2008_secure_locker_submit_v1-1.pdf, printed Oct. 11, 2011), 8 pages.
Shacham, et al., "On the Effectiveness of Address-Space Randomization," CCS'04, Oct. 25-29, 2004, Washington, D.C., Copyright 2004, 10 pages.
International Search Report and Written Opinion dated Dec. 14, 2012 for International Application No. PCT/US2012/055674, 9 pages.
International Preliminary Report on Patentability and Written Opinion dated Jan. 29, 2013 for International Application No. PCT/US2011/020677 (9 pages).
International Preliminary Report on Patentability and Written Opinion dated Jan. 29, 2013 for International Application No. PCT/US2011/024869 (6 pages).
USPTO Jun. 5, 2013 Notice of Allowance from U.S. Appl. No. 11/437,317, 8 pages.
USPTO Jun. 10, 2013 Notice of Allowance from U.S. Appl. No. 12/976,159, 9 pages.
Office Action received for U.S. Appl. No. 12/844,892, dated Jan. 17, 2013, 29 pages.
Office Action received for U.S. Appl. No. 12/844,892, dated Sep. 6, 2012, 33 pages.
Datagram Transport Layer Security Request for Comments 4347, E. Rescorla, et al., Stanford University, Apr. 2006, retrieved and printed on Oct. 17, 2011 from http://tools.ietf.org/pdf/rfc4347.pdf, 26 pages.
Internet Control Message Protocol Request for Comments 792, J. Postel, ISI, Sep. 1981, retrieved and printed on Oct. 17, 2011 from http://tools.ietf.org/html/rfc792, 22 pages.
Mathew J. Schwartz, "Palo Alto Introduces Security for Cloud, Mobile Users," retrieved Feb. 9, 2011 from http://www.informationweek.com/news/security/perimeter/showArticle.jhtml?articleID-22, 4 pages.
Requirements for IV Version 4 Routers Request for Comments 1812, F. Baker, Cisco Systems, Jun. 1995, retrieved and printed on Oct. 17, 2011 from http://tools.ietf.org/pdf/rfc1812.pdf, 176 pages.
The Keyed-Hash Message Authentication Code (HMAC), FIPS PUB 198, Issued Mar. 6, 2002, Federal Information Processing Standards Publication, retrieved and printed on Oct. 17, 2011 from http://csrc.nist.gov/publications/fips/fips198/fips-198a.pdf, 20 pages.
Zhen Chen et al., "Application Level Network Access Control System Based on TNC Architecture for Enterprise Network," In: Wireless communications Networking and Information Security (WCNIS), 2010 IEEE International Conference, Jun. 25-27, 2010 (5 pages).
USPTO Dec. 24, 2012 Nonfinal Office Action from U.S. Appl. No. 13/032,851.
USPTO Jul. 16, 2013 Final Office Action from U.S. Appl. No. 13/032,851.
International Search Report and Written Opinion, International Application No. PCT/US2012/026169, dated Jun. 18, 2012, 11 pages.
USPTO Feb. 28, 2013 Nonfinal Office Action from U.S. Appl. No. 13/275,249.
International Search Report and Written Opinion, International Application No. PCT/US2012/057312, dated Jan. 31, 2013, 10 pages.
USPTO Mar. 1, 2013 Nonfinal Office Action from U.S. Appl. No. 13/275,196.
International Search Report and Written Opinion, International Application No. PCT/US2012/057153, dated Dec. 26, 2012, 8 pages.
USPTO Mar. 1, 2013 Nonfinal Office Action from U.S. Appl. No. 13/437,900.
USPTO Sep. 13, 2013 Final Office Action from U.S. Appl. No. 13/275,249, 21 pages.
Narten et al., RFC 4861, "Neighbor Discovery for IP version 6 (IPv6)", Sep. 2007, retrieved from http://tools.ietf.org/html/rfc4861, 194 pages.
International Preliminary Report on Patentability, International Application No. PCT/US2012/026169, dated Aug. 27, 2013, 8 pages.
USPTO Oct. 2, 2013 Final Office Action from U.S. Appl. No. 13/275,196.
USPTO Oct. 4, 2013 Nonfinal Office Action from U.S. Appl. No. 12/844,892.
USPTO Oct. 25, 2013 Nonfinal Office Action from U.S. Appl. No. 12/844,964.
Patent Examination Report No. 1, Australian Application No. 2011283160, dated Oct. 30, 2013.

(56) References Cited

OTHER PUBLICATIONS

USPTO Sep. 27, 2013, Notice of Allowance from U.S. Appl. No. 13/437,900.
PCT Application Serial No. PCT/US13/71327, filed Nov. 21, 2013, entitled "Herd Based Scan Avoidance System in a Network Environment,", 46 pages.
USPTO Dec. 4, 2013 Nonfinal Office Action from U.S. Appl. No. 13/032,851.
USPTO Dec. 26, 2013 Notice of Allowance from U.S. Appl. No. 13/275,249, 32 pages.
USPTO Dec. 16, 2013 Notice of Allowance from U.S. Appl. No. 13/275,196, 11 pages.
USPTO Jan. 13, 2014 Notice of Allowance from U.S. Appl. No. 13/437,900, 30 pages.
Patent Examination Report No. 1, Australian Application No. 2011283164, dated Jan. 14, 2014, 6 pages.
USPTO Dec. 30, 2013 Final Office Action from U.S. Appl. No. 13/629,765, 9 pages.
USPTO Feb. 24, 2014 Notice of Allowance from U.S. Appl. No. 13/629,765, 8 pages.
USPTO Mar. 24, 2014 Notice of Allowance from U.S. Appl. No. 13/275,196, 9 pages.
International Search Report and Written Opinion, International Application No. PCT/US2013/071327, dated Mar. 7, 2014, 12 pages.
USPTO Apr. 15, 2014 Notice of Allowance from U.S. Appl. No. 12/844,892, 9 pages.
U.S. Appl. No. 14/257,770, entitled "Enforcing Alignment of Approved Changes and Deployed Changes in the Software Change Life-Cycle," filed Apr. 21, 2014, Inventors: Rahul Roy-Chowdhury et al., 56 pages.
International Preliminary Report on Patentability in International Application No. PCT/US2012/057312, dated Apr. 22, 2014, 5 pages.
International Preliminary Report on Patentability in International Application No. PCT/US2012/057153, dated Apr. 22, 2014, 4 pages.
USPTO Jun. 6, 2014 Final Office Action from U.S. Appl. No. 12/844,964, 30 pages.
USPTO Jun. 4, 2014 Notice of Allowance from U.S. Appl. No. 13/032,851, 16 pages.
"Optical stateful security filtering approach based on code words," Sliti, M.; Boudriga, N., 2013 IEEE Symposium on Computers and Communications (ISCC), 10 pages.
Rothenberg, et al., "A Review of Policy-Based Resource and Admission Control Functions in Evolving Access and Next Generation Networks," Journal of Network and Systems Management, 16.1 (2008) 14-45, 32 pages.
USPTO Jun. 4, 2014 Nonfinal Office Action from U.S. Appl. No. 13/728,705, 16 pages.
Jun. 2, 2014 Office Action in Korean Patent Appln. No. 2013-7022241, [English translation], 6 pages.
USPTO Aug. 11, 2014 Notice of Allowance from U.S. Appl. No. 12/844,892, 8 pages.
International Search Report and Written Opinion in International Application No. PCT/US2013/066690, dated Jul. 10, 2014, 12 pages.
Aug. 12, 2014 Office Action in Japanese Patent Application No. 2013-555531, English translation, 3 pages.
USPTO Sep. 10, 2014 Final Office Action from U.S. Appl. No. 13/229,502, 18 pages.
USPTO Sep. 11, 2014 Notice of Allowance from U.S. Appl. No. 12/844,964, 10 pages.
USPTO Oct. 2, 2014 Nonfinal Rejection from U.S. Appl. No. 14/257,770, 8 pages.
USPTO Oct. 27, 2014 Notice of Allowance from U.S. Appl. No. 13/728,705, 25 pages.
Muttik, Igor, and Chris Barton, "Cloud security technologies," Information security technical report 14.1 (2009), 1-6, 6 pages.

Nov. 13, 2014 Office Action in Japanese Patent Application No. 2013-521770, English translation, 2 pages.
Patent Examination Report No. 1, Australian Application No. 2012220642, dated Nov. 5, 2014, 3 pages.
Notice of Allowance received for Korean Patent Application No. 10-2013-7022241, dated Dec. 12, 2014, 3 pages.
Extended European Search Report in Application No. 12842144.3-1853/2769509 PCT/US2012/057312, dated Feb. 6, 2015, 6 pages.
Notice of Reasons for Refusal in Japanese Patent Application No. JP 2013-521767, dated Feb. 17, 2015, 5 pages of English language translation, 4 pages of Japanese language Office Action.
Baba, Tatsuya, et al., "A Proposal of an Integrated Worm Countermeasure System Based on Dynamic VLAN Control," Journal of Information Processing Society of Japan, Japan, Information Processing Society of Japan, Aug. 15, 2006, vol. 47, No. 8, pp. 2449-2511, 14 pages, English language Abstract only.
Fujita, Keisuke, et al., "Proposal of DF system with boot control function against unauthorized programs," Transactions of Computer Security Symposium 2007, Japan, Information Processing Society of Japan, Oct. 31, 2007, vol. 2007, No. 10, pp. 501-506, 7 pages, English language Abstract only.
Ashiwa, Takashi, "IT Keyword too late to ask: Bot," Nikkei Computer, Japan, Nikkei Business Publications, Oct. 30, 2006, No. 664, pp. 244-249, 14 pages, 7 pages of English translation.
Feb. 27, 2015 Office Action in Japanese Patent Application No. 2013-521770, English translation, 3 pages.
Mar. 2, 2015 Office Action in Korean Patent Appln. No. 2014-7021824, English translation, 4 pages.
Oct. 27, 2014 Office Action in EP Application No. 11 703 741.6-1870, 6 pages.
Feb. 28, 2015 Office Action in CN Application No. 201180046900.4, English translation, 29 pages.
Mar. 23, 2015 Office Action in CN Application No. 201180046850X, English translation, 38 pages.
USPTO May 28, 2015 Nonfinal Rejection from U.S. Appl. No. 14/583,509, 17 pages.
Apr. 20, 2015 Office Action in Japanese Patent Appln. No. 2013-555531, [English translation], 2 pages.
Apr. 29, 2015 Supplementary European Search Report in EP Application No. EP 12 84 1554, 7 pages.
Cheneau, Tony, et al., "Significantly improved performances of the cryptographically generated addresses thanks to ECC and GPGPU," Computers & Security, vol. 29, No. 4, Jun. 2010 (Jun. 2010), pp. 419-431, 13 pages.
USPTO Jul. 6, 2015 Nonfinal Rejection from U.S. Appl. No. 14/127,395, 32 pages.
USPTO Jul. 16, 2015 Corrected Notice of Allowability in U.S. Appl. No. 13/032,851, 3 pages.
International Preliminary Report on Patentability, International Application No. PCT/US2013/071327, dated Jul. 9, 2015, 11 pages.
USPTO Aug. 12, 2015 Nonfinal Rejection from U.S. Appl. No. 14/263,164, 33 pages.
USPTO Sep. 29, 2015 Notice of Allowance from U.S. Appl. No. 14/583,509, 31 pages.
USPTO Oct. 19, 2015 Notice of Allowance from U.S. Appl. No. 14/263,164, 13 pages.
Decision to Grant a Patent in Japanese Patent Application No. JP 2013-521767, dated Oct. 22, 2015, 3 pages of English language translation.
Sep. 8, 2015 Office Action in Japanese Patent Application No. 2013-555531, English translation, 2 pages.
Office Action in CN 201180046900.4, dated Nov. 3, 2015, English translation, 29 pages.
USPTO Nov. 6, 2015 Nonfinal Rejection from U.S. Appl. No. 14/277,954, 32 pages.
USPTO Nov. 23, 2015 Nonfinal Rejection from U.S. Appl. No. 14/599,811, 27 pages.
Nov. 20, 2015 Office Action in CN Application No. 201180046850X, English translation, 36 pages.
Nov. 20, 2015 Office Action in CN Application No. 201280050877.0, English translation, 5 pages.
Nov. 13, 2015 Office Action in CN Application No. 201280010062.X, English translation, 5 pages.

(56) References Cited

OTHER PUBLICATIONS

USPTO Dec. 2, 2015 Notice of Allowance from U.S. Appl. No. 14/127,395, 7 pages.
USPTO Feb. 2, 2016 Notice of Allowance from U.S. Appl. No. 14/263,164, 10 pages.
USPTO Feb. 17, 2016 Nonfinal Rejection from U.S. Appl. No. 14/635,096, 17 pages.
USPTO Mar. 11, 2016 Notice of Allowance from U.S. Appl. No. 14/583,509, 32 pages.
Mar. 9, 2016 Office Action in CN Application No. 201180046900.4, English translation, 11 pages.
USPTO Apr. 5, 2016 Notice of Allowance from U.S. Appl. No. 14/277,954, 16 pages.
USPTO Apr. 11, 2016 Notice of Allowance from U.S. Appl. No. 12/291,232, 14 pages.
Apr. 8, 2016 Office Action in EP Application No. 11 710 915.7, 5 pages.
Feb. 25, 2016 Office Action in CN Application No. 201280053580.X, English translation, 16 pages.
International Preliminary Report on Patentability in International Application No. PCT/US2013/066690, dated Apr. 26, 2016, 8 pages.
May 3, 2016 Office Action in CN Application No. 201180046850X, with English translation, 10 pages.
USPTO Jun. 6, 2016 Notice of Allowance from U.S. Appl. No. 14/127,395, 40 pages.
USPTO Jun. 6, 2016 Final Rejection from U.S. Appl. No. 14/599,811, 66 pages.
May 24, 2016 Office Action in CN Application No. 201280050877.0, no English translation, 3 pages.
Jul. 5, 2016 Office Action in CN Application No. 201280010062.X, no English translation, 8 pages.
Aug. 11, 2016 Office Action in CN Application No. 2011800469004, with English translation, 29 pages.
Jun. 16, 2016 Reasons for Refusal in JP Application No. 2015-133517, with English translation, 8 pages.
Sep. 12, 2016 Office Action in CN Application No. 201280050877.0, no English translation, 3 pages.
USPTO Sep. 29, 2016 Notice of Allowance from U.S. Appl. No. 14/127,395, 12 pages.
USPTO Oct. 6, 2016 Nonfinal Rejection from U.S. Appl. No. 15/168,004, 18 pages.
Binde, Beth et al., "Assessing Outbound Traffic to Uncover Advanced Persistent Threat," SANS Technology Institute, Published May 22, 2011, pp. 1-35, 35 pages.
Foresti, Stefano et al., "Visual Correlation of Network Alerts," Visualization for Cybersecurity, Published 2006, pp. 1-12, 12 pages.
USPTO Oct. 26, 2016 Notice of Allowance from U.S. Appl. No. 14/599,811, 9 pages.
USPTO Nov. 25, 2016 Nonfinal Rejection from U.S. Appl. No. 14/827,396, 15 pages.
Dec. 28, 2016 Decision to Grant in JP Application No. 2015-133517, no English translation, 3 pages.
Nov. 15, 2016 Office Action in CN Application No. 201280053580.X, with English translation, 7 pages.
Communication re EP Application No. 12 706 424.4, dated Feb. 3, 2017, 6 pages.
USPTO Apr. 17, 2017 Final Rejection from U.S. Appl. No. 15/168,004, 41 pages.
Supplementary European Search Report in EP Application No. 13 89 5997, dated Mar. 21, 2017, 7 pages.
USPTO Apr. 14, 2017 Notice of Allowance from U.S. Appl. No. 14/599,811, 13 pages.
Notice of Reasons for Rejection in JP Application No. 2016-001060, dated Feb. 7, 2017, with English translation, 3 pages.
Mar. 7, 2017 Notice of Granting Patent Right for Invention in CN Application No. 201280053580.X, with English translation, 3 pages.

\* cited by examiner

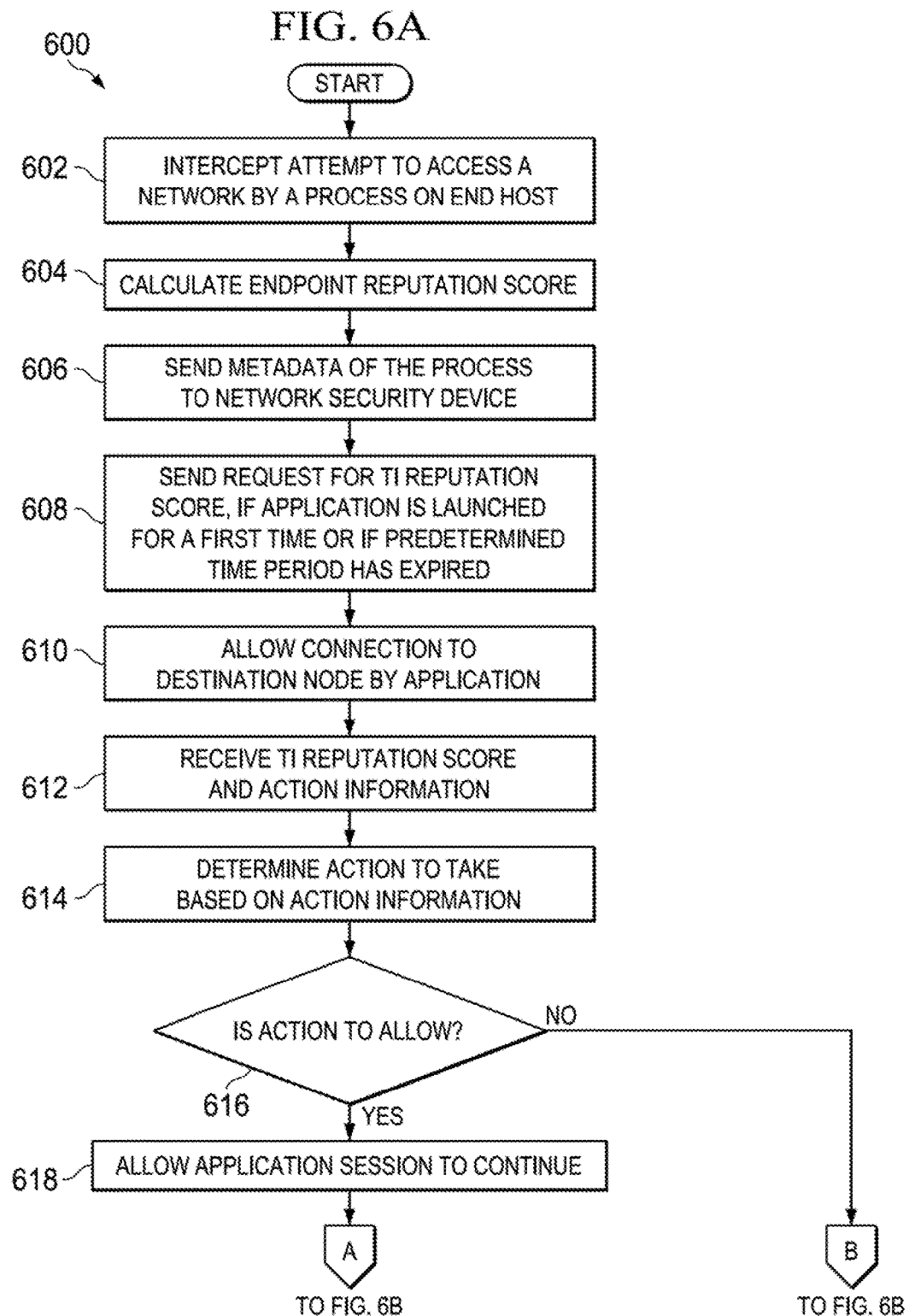

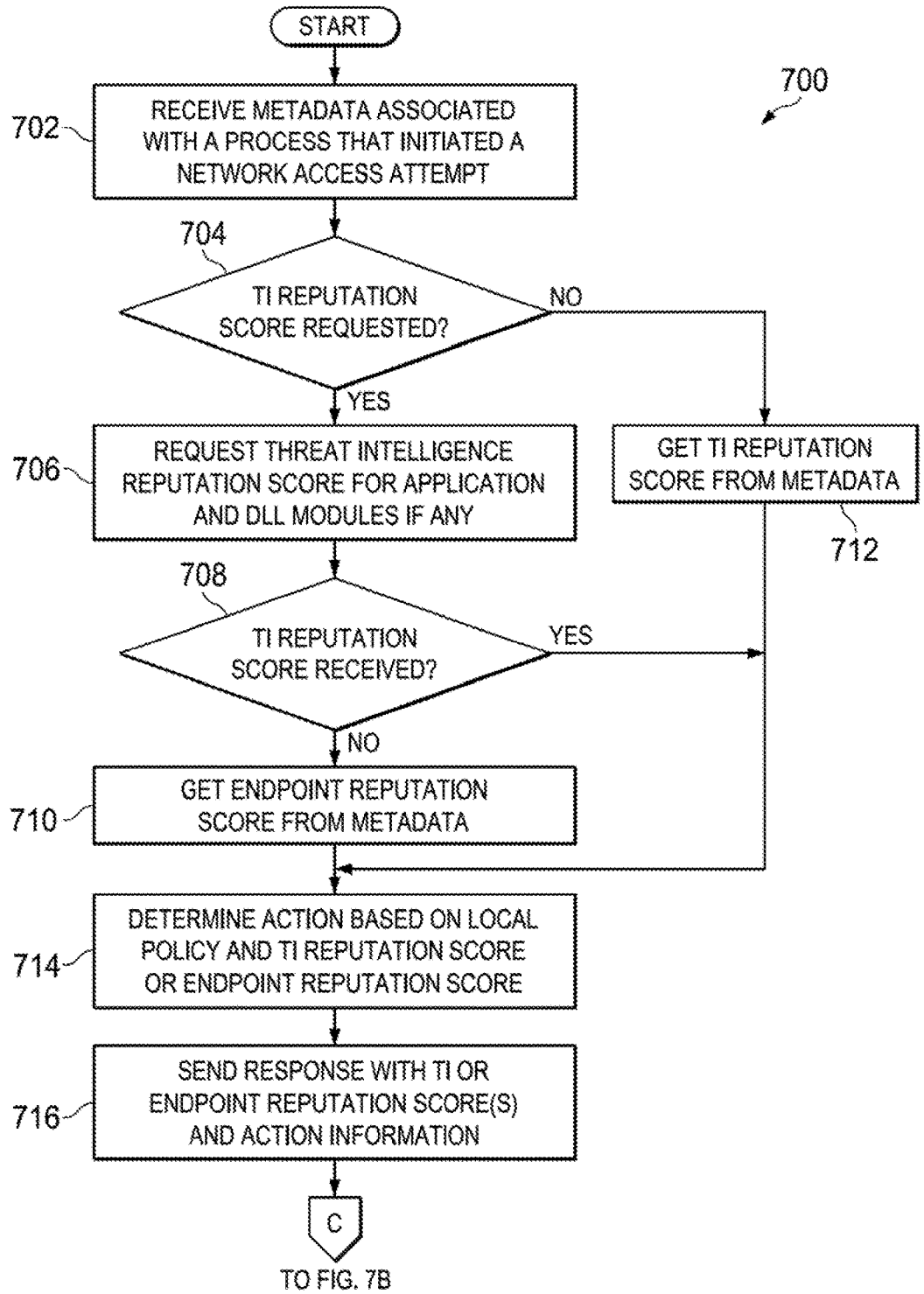

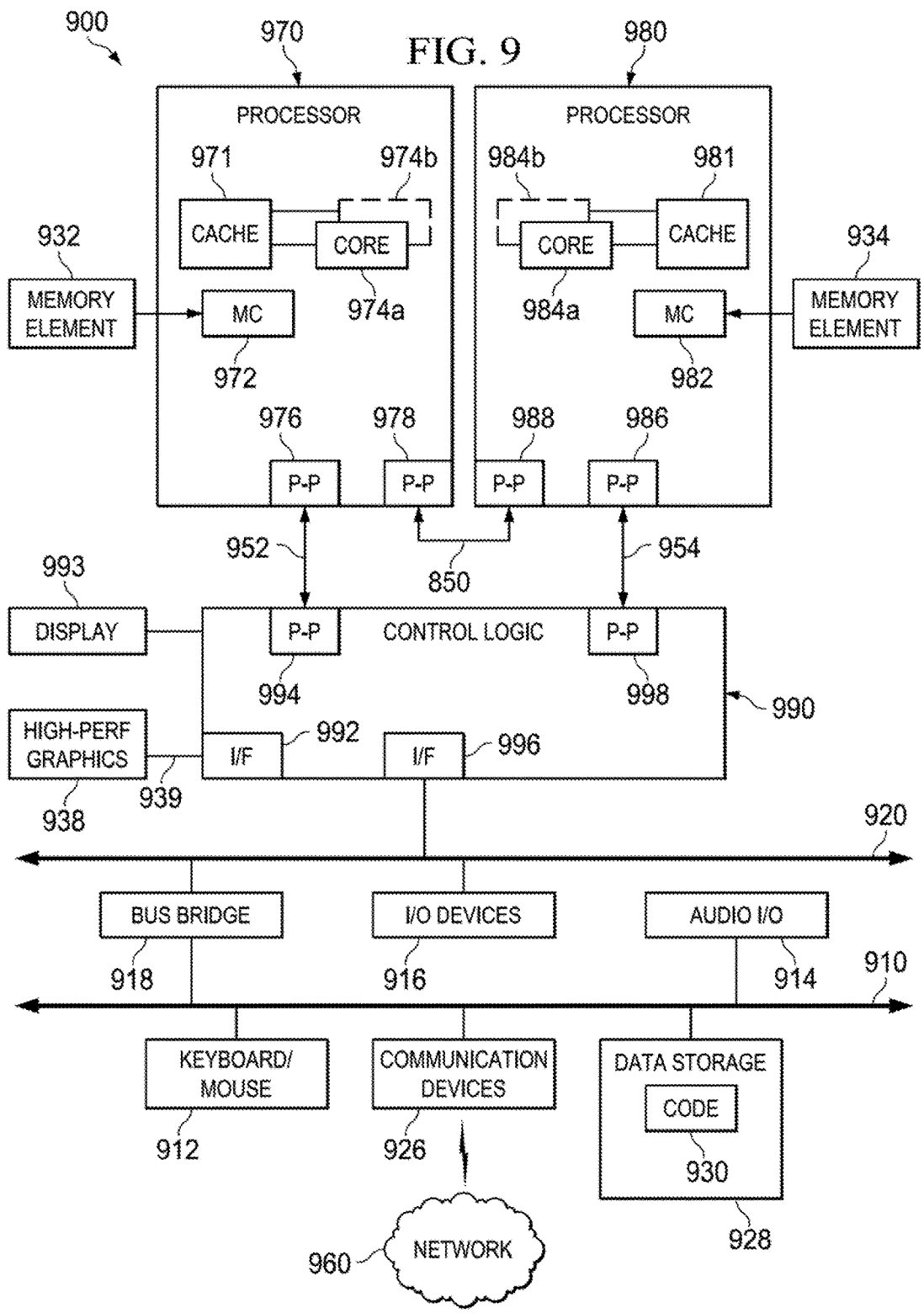

AGENT ASSISTED MALICIOUS APPLICATION BLOCKING IN A NETWORK ENVIRONMENT

CROSS-REFERENCE TO RELATED APPLICATIONS

This Application is a continuation (and claims the benefit of priority under 35 U.S.C. § 120) of U.S. application Ser. No. 14/127,395, filed Dec. 18, 2013, entitled "AGENT ASSISTED MALICIOUS APPLICATION BLOCKING IN A NETWORK ENVIRONMENT," Inventors Chandan CP et al., which is a National Stage filing under 35 U.S.C. § 371 of International Application No. PCT/US2013/066690, filed on Oct. 24, 2013, entitled "AGENT ASSISTED MALICIOUS APPLICATION BLOCKING IN A NETWORK ENVIRONMENT." The disclosures of the prior applications are considered part of (and are incorporated in their entireties by reference in) the disclosure of this application.

TECHNICAL FIELD

This disclosure relates in general to the field of network security, and more particularly, to agent assisted malicious application blocking in a network environment.

BACKGROUND

The field of network security has become increasingly important in today's society. The Internet has enabled interconnection of different computer networks all over the world. In particular, the Internet provides a medium for exchanging electronic communications between various systems in the same or different computer networks. While the use of the Internet and other networking infrastructures has transformed business and personal communications, it has also become a vehicle for malicious operators to gain unauthorized access to systems and networks and for intentional or inadvertent disclosure of sensitive information.

Malicious software ("malware") that infects an end host may be able to perform any number of malicious actions, such as sending out spam or malicious emails from the end host, stealing sensitive information from a business or individual associated with the end host, propagating to other host systems, assisting with distributed denial of service attacks and/or sabotage or espionage (or other forms of cyber-warfare), for example. Although various approaches are used to detect malware traversing a network, some malware still eludes detection. Detecting and stopping the spread of malware or malicious activities caused by malware is made even more complicated due to the continually-evolving array of tactics exploited by malicious operators. Hence, significant administrative challenges remain for protecting computers and computer networks from malware. Security professionals need to develop innovative tools to combat such tactics that allow malicious operators to exploit computers.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 6A-6B show a simplified flowchart illustrating potential operations associated with an end host in at least one embodiment;

FIGS. 7A-7B show a simplified flowchart illustrating potential operations associated with a security device at least one embodiment;

FIG. 9 is a block diagram of an example computing system according to an embodiment.

DETAILED DESCRIPTION OF EMBODIMENTS

Figure 1:
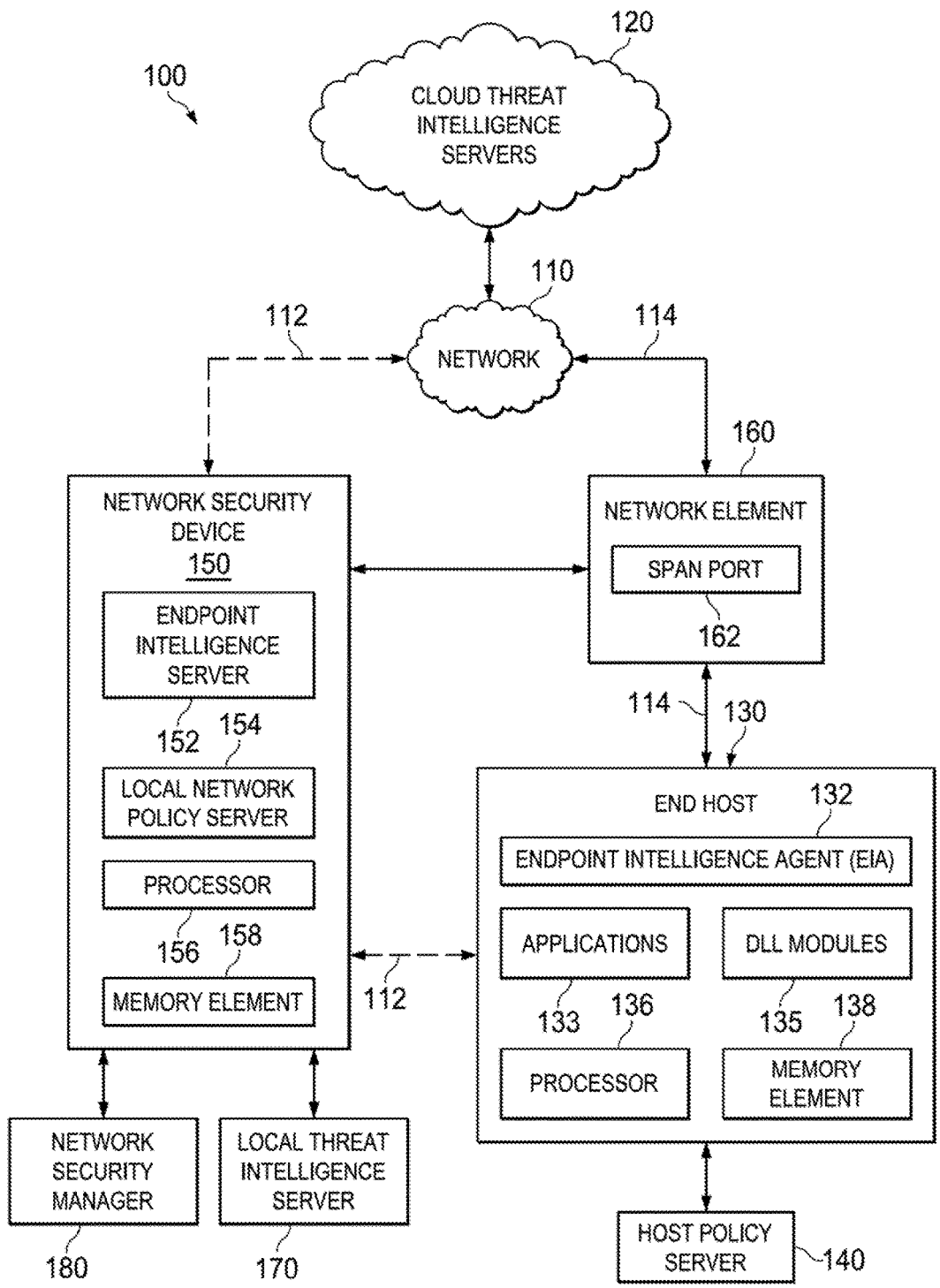
FIG. 1 is a simplified block diagram of a computing system for blocking malicious applications in a network environment in accordance with the present disclosure.

FIG. 1 is a simplified block diagram of a computing system 100 for blocking malicious applications in a network environment according to at least one embodiment of the present disclosure. Computing system 100 may include a protected network that includes at least one end host 130, an end host policy server 140, a network security device 150, a local threat intelligence server 170, and a network security manager 180. The protected network can be configured to communicate with other systems and networks via any suitable network such as network 110. In at least one embodiment, network 110 can be a wide area network such as the Internet. Cloud threat intelligence servers 120 may be accessible to the protected network via network 110.

With reference to particular elements, end host 130 can include an endpoint intelligence agent (EIA) 132, applications 133, dynamic link library (DLL) modules 135, at least one processor 136, and at least one memory element 138. Network security device 150 can include an endpoint intelligence server 152, a local network policy server 154, at least one processor 156, and at least one memory element 158. In at least one embodiment, a switch, router, or other suitable network element 160 may be provided in the protected network to facilitate communication between end host 130 and network 110. In this configuration, network security device 150 is out-of-band and network element 160 receives network traffic from end host 130 and sends network traffic to end host 130. Network element 160 may include a SPAN port 162 to enable copying network traffic to network security device 150. In other embodiments, network security device 150 may be configured in-line in order to receive network traffic from end host 130 without any intervening network element that enables network traffic to bypass network security device 150. Local threat intelligence server 170 can contain file reputation scores of certain applications and dynamic link libraries, and may provide such information to network security device 150 when requested. Network security manager 180 can receive metadata associated with a process of end host 130, and can provide a user interface to display information associated with the process to a user.

For purposes of illustrating certain example techniques of computing system 100 for blocking malicious applications, it is important to understand the communications that may be traversing the network environment. The following foundational information may be viewed as a basis from which the present disclosure may be properly explained.

Malicious software can disrupt a computer network and lead to unstable and/or insecure systems. As used herein, malicious software (also referred to herein as "malicious applications" or "malware"), is a broad term commonly used to describe software designed to engage in hostile and/or unwanted behavior on a computer, and generally includes any software designed to interfere with the normal operation of a computer or network and/or to gain unauthorized access to a computer or network. Once an end host is compromised, malware may subvert the end host and use it for malicious activity. In some instances, malware may be designed to steal, destroy, disclose, modify, or otherwise compromise data. Malware may also include propagation vectors that enable it to spread within an organization's network (e.g., a protected network) or across other networks or computer systems. Examples of malware can include, but are not limited to, viruses, spam, phishing scams, denial-of-service (DOS) attacks, directory harvest, botnets, spyware, adware, trojans, and worms.

It will be appreciated that the broad scope of this disclosure intends for references to 'software' to encompass any electronic file or object comprising instructions that can be understood and processed on a computer such as, for example, applications (e.g., executable files, object files, script files, interpreter files, etc.) and dynamic link library (DLL) modules or other modules that can be loaded and linked when preparing an application for execution. An application or DLL module is malicious if the application or DLL module is malware or if it is infected with malware (e.g., a benign application or DLL module subverted by malware). Additionally, if a process instantiated from an application loads a DLL module that is malicious, then the application may also be considered 'malicious'.

One common approach to malware detection involves scanning applications to identify known signatures, and to obtain a file reputation score based on the signatures. A signature is a hash value that is typically expressed as a fixed string of numerical digits. A hash value can be derived by applying a cryptographic hash algorithm to an application or to one or more portions thereof. One commonly known algorithm is the MD5 message-digest algorithm, which is a cryptographic hash function that produces a hash value having a predetermined bit length (e.g., 128 bits) and is specified in "Request for Comments (RFC) 1321, MD5 Message-Digest Algorithm, R. Rivest, April 1992, Updated by RFC6151."

A file reputation score (also referred to herein as 'threat intelligence score') can be a score that reflects the likelihood a particular file (i.e., an application or other module) is malicious. File reputation scores can be configured to range, for example, on a scale from benign to malicious, or good to bad. In some examples, the range could include varying degrees, such as good, poor, serious, critical, unknown, etc. In other examples, the range could include a simple use of good, bad, or unknown. File reputation scores can be obtained by querying threat intelligence servers, locally or globally (e.g., in the cloud), and providing a hash value of the application at issue. The threat intelligence servers can determine whether the hash is known (i.e., if the application represented by the hash has been evaluated and a score derived for the application). If the application is known, the threat intelligence servers can provide the corresponding score to the querying device. Threat intelligence servers may derive file reputation scores for hashes in any suitable way, including, but not limited to, collective intelligence, analysis of the particular file, and/or correlation with other threat vectors such as web, email and network threat data, etc.

In a large network with many end user hosts, security software that evaluates every network connection and that may contact local and/or cloud services for reputation information, can use significant localized resources. A network solution, however, can also utilize tremendous network resources by repeated attempts to establish network connections from an end user host. Thus, solutions are needed that minimize the use of network resources, while effectively blocking malicious applications from making network connections.

Some malware can be configured to hide or evade detection during the execution of a process that corresponds to an application with a good reputation. For instance, an application could be configured to load one or more other modules, such as dynamic link library (DLL) modules, during execution. In some configurations, modules may be loaded after a process associated with an application has already established a network session. Thus, initial evaluations of an application and its loaded modules may not be recognized as malicious based on a file reputation score. In another example, when malware is downloaded during a seemingly benign network connection, the malware could affect the application or other modules used by the application (e.g., DLLs). This may not be quickly detected by conventional security solutions. Thus, solutions are also needed to identify and block malware that has been infused in network traffic.

A system for blocking malicious applications in a network environment, as outlined in the FIGURES, can resolve these issues (and others). In computing system 100, an endpoint intelligence agent intercepts network access attempts on an end host (or on a virtual desktop infrastructure (VDI) server) and provides metadata of the application to a network security device. The network security device can query a threat intelligence server and/or cloud services, to obtain a file reputation score (also referred to herein as 'threat intelligence reputation score' and 'TI reputation score') for the application. The TI reputation score can be used to determine an action to be taken by the end host, based on one or more local network policies. The network security device can provide the TI reputation score and action information to the end host. Depending on the action information (i.e., instructions, notifications, or other indication of an action to be taken), the end host can create a rule to implement the action, such as blocking the application from making future network connections. Thus, the other hosts in the network can be protected from the malware on the end host by blocking the application at the end host. If the application has a good reputation, however, or if policies at the network security device indicate a blocking action is not appropriate, then the network traffic may be allowed. For example, the end host may simply allow a network session to continue by not performing any blocking actions.

When a network connection is allowed, additional evaluations may continue, at both the network security device and the end host, during the network session. In at least one embodiment, loaded or invoked modules, such as DLL files, of the application may be evaluated on the end host to determine whether they have been compromised by malware. If so, then the end host may assign a local score ('endpoint reputation score') to the application and send it to the network security device. The network security device can determine an action based on local network policy and the endpoint reputation score, and can send action information indicating the action to be taken back to the end host. Depending on the action information, the end host may then create a rule to block the application from making future network connections from the end host. In another scenario when the network traffic is allowed, the network security device may continue to monitor the network traffic for malware. If malware is detected, the network security device can correlate the network traffic with network connection information from the end host in order to identify the end host and application associated with the network traffic. The network security device can provide the end host with reputation information and action information.

When a bad TI reputation score for an application is provided to an end host, the on-going network traffic associated with the currently running process can be blocked at either the network security device, the end host, or both, depending on particular implementations. If the network security device is in-line, it can block the on-going network traffic, but if the network security device is out-of-band, then it can inform the end host to also block the on-going network traffic. Thus, embodiments of computing system 100 can monitor network traffic and block malicious applications of an established session and can prevent future network connections associated with the detected malicious application.

Turning to FIG. 1, FIG. 1 illustrates a simplified example of computing system 100 for blocking malicious applications in a network environment. For ease of illustration, a single end host 130 is shown in communication with host policy server 140, network security device 150, and possibly, network element 160. It will be apparent, however, that numerous end hosts could be configured to communicate to network 110 via network security device 150 or network element 160, and host policy server 140 could be configured to manage policies for multiple end hosts. Moreover, in at least some implementations, multiple end hosts could be virtualized with a virtualized desktop infrastructure (VDI) server communicating with network security device 150 and host policy server 140. In this scenario, the VDI server could be configured with endpoint intelligence agent 132 and could perform the intercepting and application blocking functions for multiple virtualized end hosts.

In at least one embodiment, network security device 150 could be configured in-line with end host 130. In this in-line embodiment, network security device 150 could receive network traffic from end host 130 and forward the network traffic to a local or remote destination node, for example, via networks 112 and 110. In at least one other embodiment, network security device 150 could be configured out-of-band, and network element 160 could be configured in-line with end host 130. In this out-of-band embodiment, network security device 150 could receive, from network element 160, network traffic associated with end host 130 and could forward the network traffic to a local or remote destination node, for example, via networks 114 and 110. SPAN port 162 could be configured to provide copies of data packets of the network traffic to network security device 150.

Generally, computing system 100 can be implemented in any type or topology of networks. Networks 112 (in-line embodiment), 114 (out-of-band embodiment), and 110 each represent a series of points or nodes of interconnected communication paths for receiving and transmitting packets of information that propagate through computing system 100. These networks offer a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. These networks may be inclusive of any number of wire line (e.g., Ethernet, etc.) and wireless technologies (e.g., Institute of Electrical and Electronics Engineers (IEEE) Std 802.11™-2012, published Mar. 29, 2012, IEEE Std 802.16™-2012, published Aug. 17, 2012, WiFi, WiMax, Dedicated short Range Communications (DSRC), etc.), satellite, cellular technologies (e.g., 3G/4G/5G/nG, etc.), other radio frequencies (e.g., near field communications (NFC), radio frequency identification (RFID), etc.), and/or any other networking protocols that facilitate network communications in a network environment. In at least one embodiment, networks 112 and 114 represent embodiments of a protected network, which can be configured as an internal, potentially private, network associated with an entity (e.g., business, school, government agency, organization, etc.). In at least one embodiment, network 110 represents a wide area network (e.g., the Internet) that enables access to other networks and systems by end hosts of the internal network, such as end host 130.

In computing system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data that can be routed between a source node and a destination node on a packet switched network, such as networks 112, 114, and 110. A packet includes a source network address and a destination network address. By way of example, these network addresses can be Internet Protocol (IP) addresses in a TCP/IP messaging protocol. The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

Generally, 'servers,' hosts,' and 'computing devices,' including such devices used to implement computing system 100 (e.g., 120, 130, 140, 150, 160, 170, 180), can comprise all types of apparatus, electronic computing devices, and machines operable to receive, transmit, process, store, and/or manage data and information associated with embodiments disclosed herein. These computing devices can each include one or more processors, computer-readable memory, and any suitable hardware, software, firmware, components, modules, or objects that facilitate the operations thereof. These computing devices may also include interfaces employing any suitable connection (wired or wireless) for receiving, transmitting, and/or otherwise communicating data or information in computing system 100. This may be inclusive of appropriate algorithms and communication protocols that allow for the effective exchange of data or information. Additionally, computing devices may be configured to execute any operating system (e.g., Linux, UNIX, Windows, Windows Server, etc.) to manage the hardware components therein. Further, some computing devices may include virtual machines adapted to virtualize execution of a particular operating system.

In at least one embodiment, network security device 150 is a network element that can host software applications and other programs involving network security. In some implementations, network security device 150 may also be configured to facilitate communication between an end host (e.g., end host 130) and other local or remote computing devices and networks. Network elements are a type of a computing device and can include, but are not limited to, firewalls, servers, network appliances, routers, switches, gateways, bridges, load balancers, processors, modules, or any other suitable device, component, element, or object operable to exchange information in a network environment.

End host 130 can include computing devices generally implemented as endpoint devices in a network such as, for example, personal computers, laptops, cell phones, smart phones, tablet computers, personal digital assistants, media clients, mobile internet devices, and other devices adapted to receive, send, or otherwise communicate in computing system 100. End host 130 can also include network elements or other computing devices configured to initiate network communications with other local or remote computing devices. It will be understood that there may be any number of end hosts configured in computing system 100 (e.g., in networks 112, 114).

Computing devices of computing system 100, such as end host 130 and network security device 150, may include software modules (e.g., endpoint intelligence agent 132, endpoint intelligence server 152) to achieve, or to foster, operations as outlined herein. These modules may be suitably combined or partitioned in any appropriate manner, which may be based on particular configuration and/or provisioning needs. In some embodiments, one or more of such operations may be carried out by hardware and/or firmware, implemented externally to these elements, or included in some other computing device to achieve the intended functionality. These elements may also include software (or reciprocating software) that can coordinate with other computing devices in order to achieve the operations, as outlined herein.

In at least one embodiment, endpoint intelligence server 152 of network security device 150 and endpoint intelligence agent 132 of end host 130 are configured to cooperate to identify malicious applications associated with network traffic traversing, or attempting to traverse, computing system 100. Host policy server 140 may be configured to push a monitoring port network address (e.g., Internet Protocol (IP) address) of network security device 150 to endpoint intelligence agent 132 in accordance with policy. Endpoint intelligence agent 132 can provide metadata to endpoint intelligence server 152 to enable identification of malicious applications.

Metadata provided by endpoint intelligence agent 132 can be associated with a process on end host 130 attempting to make a network connection to a destination host via network 110, for example. This attempt to make a network connection is referred to herein as a 'network access attempt.' An end host process is an instance of an application that is being executed on the end host. When network traffic is initiated by a process on end host 130, end host 130 is referred to as a 'source host'. A source host can send network traffic to a destination host, which can be a node in any local or remote network (e.g., networks 112, 114, 110, etc.) accessible to the source host.

Metadata that is communicated to endpoint intelligence server 152 by endpoint intelligence agent 132 can provide visibility about end host 130, the current user of end host 130, and the application (e.g., of applications 133) and process associated with certain network traffic. Metadata can include user information, host application information, and/or host process information. User information could include one or more of a user name/identifier, a security identifier (SID), etc. Host application and process information could include one or more of application name and file path (AppPath), hash or checksum of application (MD5Hash), reputation of application (AppReputation), reputation of dynamic link library modules (DLLReputation), endpoint reputation score (MD5ConfidenceScore), threat intelligence reputation score of application (MD5GTIScore), application category, process name, parent process name, domain, a tuple (e.g., a 5 tuple) of connection information for the network access attempt, particular information about the application or its loaded modules (e.g., version information, creation day/time, modification day/time, signor information, etc.), etc.

The various metadata provides different information to network security device 150. A SID is a primary key for any object in an Active Directory (e.g., printer objects, group objects, etc.) and is unique to a domain. AppPath is the file name and path where the application is stored on end host 130. MD5Hash is a hash value of the executable application generated, for example, by an MD5 message-digest algorithm as previously discussed herein. The metadata may also include hash values of each of the other applications or modules loaded by the application, such as DLL modules.

MD5ConfidenceScore is an endpoint reputation score that can be determined by heuristic algorithms running on the end host. Heuristic algorithms can be configured to perform a heuristic analysis of an application or DLL module including, but not limited to, whether it performs virus-like activities during execution or has virus-like attributes in its code. In addition, a module such as a DLL module, may be evaluated to determine whether it performs appropriate activities for the particular application that invoked the DLL module. The endpoint reputation score can be used by network security device 150 when a TI reputation score is not available or accessible.

AppReputation and DLLReputation are scores calculated based on the quality of the application or DLL module (how good/benign or bad/malicious the application or DLL module is determined to be). These scores can be calculated on the end host and can be based on the TI reputation score/endpoint reputation score (e.g., TI reputation score previously received from security device 150 and cached in end host 130 or endpoint reputation score calculated on end host by heuristic algorithm). In addition, multiple DLLReputations may be provided if multiple DLL modules are invoked by the process.

The tuple can include connection information associated with the network access attempt. In at least one embodiment, the tuple includes source address, source port, destination address, destination port, and protocol. Source and destination addresses can be the network addresses of the source host (e.g., end host 130) and the destination host, respectively. The destination host is the host with which the process on the source host is attempting to establish a network session. In at least one embodiment, network addresses can be Internet Protocol (IP) addresses in a packet switched network. Source and destination ports can be the ports on the source and destination hosts, respectively, used by the process to attempt to establish a network session between the source host and the destination host. Protocol can be the particular protocol (e.g., Transmission Control Protocol/Internet Protocol (TCP/IP)) used by the process to access the network. The tuple of the metadata can be used to correlate network traffic with a process to identify the end host on which the process is running and the associated application.

Some information that can be included in the metadata may not be available for certain network traffic. For example, a process may not have any loaded DLL modules, an application or DLL may be unknown and therefore may not have a reputation, application category may be unknown, etc. In another example, a TI reputation score may not be available unless the corresponding application was previously associated with a network access attempt and the TI reputation score was returned to end host 130 and stored in cache or other memory.

Endpoint intelligence agent 132 can receive action information and reputation information from endpoint intelligence server 152 to create a blocking rule for certain network traffic or to allow certain network traffic. If network security device 150 determines that a particular application has violated a local network policy, a blocking action can be prescribed by endpoint intelligence server 152 based on a hash of the particular application. Endpoint intelligence agent 132 may receive a notification from endpoint intelligence server 152 (e.g., via action information) to block the particular application from making future network connections. Endpoint intelligence agent 132 can then create and implement a rule on end host 130 to block the application. In at least one embodiment, a rule implemented to block an application can be configured to prevent the application from executing. If network security device 150 is out-of-band, then endpoint intelligence agent 132 may also receive notification (e.g., in the action information) from endpoint intelligence server 152 to block any on-going traffic of the current process associated with the hash. Although a hash can represent a particular application associated with a process on end host 130 attempting network access, in some scenarios, the hash could represent a module loaded by the process, such as a DLL module.

Endpoint intelligence agent 132 may also be configured to evaluate loaded modules (e.g., of DLL modules 135) of processes with established (and allowed) network sessions. If malware is successfully downloaded to end host 130, possibly during the established network session itself, then if the malware is executed it could potentially infect the module and compromise the network session. In at least one embodiment, this determination may be made by a heuristic analysis performed by heuristic detection algorithms, etc. If a determination is made that a DLL has been infected, then endpoint intelligence agent 132 can assign an endpoint reputation score to the module and send it to network security device 150 for evaluation and action information on how to handle the module. In some scenarios, end host 130 can determine an action to take based on the endpoint reputation score and a local host policy, from host policy server 140 for example. Local host policies may be configurable by an administrator or other authorized user. End host 130 can notify network security device 150 regarding the action taken on end host 130, along with the endpoint reputation score.

Endpoint intelligence server 152 of network security device 150 can be configured to receive metadata of a process executing on end host 130 to enable identification of malicious applications associated with the process. The metadata can include one or more hashes that are generated based on an application and possibly one or more other modules associated with the application (e.g., DLLs loaded by the process). The hashes may be evaluated based on local and/or remote threat intelligence information.

In at least one embodiment, threat intelligence information could comprise one or more whitelists, one or more blacklists, or any suitable combination thereof. In at least one embodiment, a whitelist could include hash values of applications and other modules that have been determined to be benign or safe to run, and a blacklist could include hash values of applications and other modules that have been determined to contain malware and/or to engage in malicious behavior. In at least one embodiment, threat intelligence information may include a TI reputation score associated with each hash value. The TI reputation scores can represent a degree of maliciousness or criticality of the application (or DLL module) associated with the particular hash value. For example, scores less than 4 may indicate a critical threat, scores between 5-6 may indicate a serious threat, scores between 7-9 may indicate a slight threat, and a score of 10 may indicate no threat.

When network security server 150 receives a TI reputation score for a particular application, network security device 150 can use the score to determine one or more actions to be taken based on local network policy. Local network policies may be applied to a TI reputation score to determine an action to be performed on end host 130. For example, a policy may be configured to require any application having a TI reputation score less than 4 to be blocked. Another policy may require applications having a threat intelligence score between 5-9 to be quarantined. In addition, policies may be configured to determine what action to take on applications that are unknown (e.g., not on whitelist and not on blacklist). Policies may be configurable by an administrator or other authorized user, for example, in local network policy server 154. In at least one embodiment, network security manager 180 may provide a user interface to allow authorized users to configure policies. Local network policy server 154 could be configured as part of network security device 150, or could be configured separately, in whole or in part, from network security device 150.

In at least one embodiment, network security device 150 may query local threat intelligence server 170 for threat intelligence information. The local threat intelligence information in server 170 could be received from a remote threat intelligence service, such as cloud threat intelligence servers 120. Local threat intelligence server 170 could include a copy, in whole or in part, of data from cloud threat intelligence servers 120, and may be updated periodically. Network security device 150 may also be configured to query remote threat intelligence servers (e.g., 3rd party providers of security information) for threat intelligence information. For example, network security device 150 may query cloud threat intelligence servers 120 when local threat intelligence server 170 is unable to provide threat intelligence information for a particular application. In another embodiment, at least some threat intelligence information may be cached, in whole or in part, on network security device 150. In other embodiments, network security device 150 may be configured to query any suitable combination of caches, cloud servers, local servers, or any other system or device accessible to network security device 150, based on particular needs.

Figure 2:
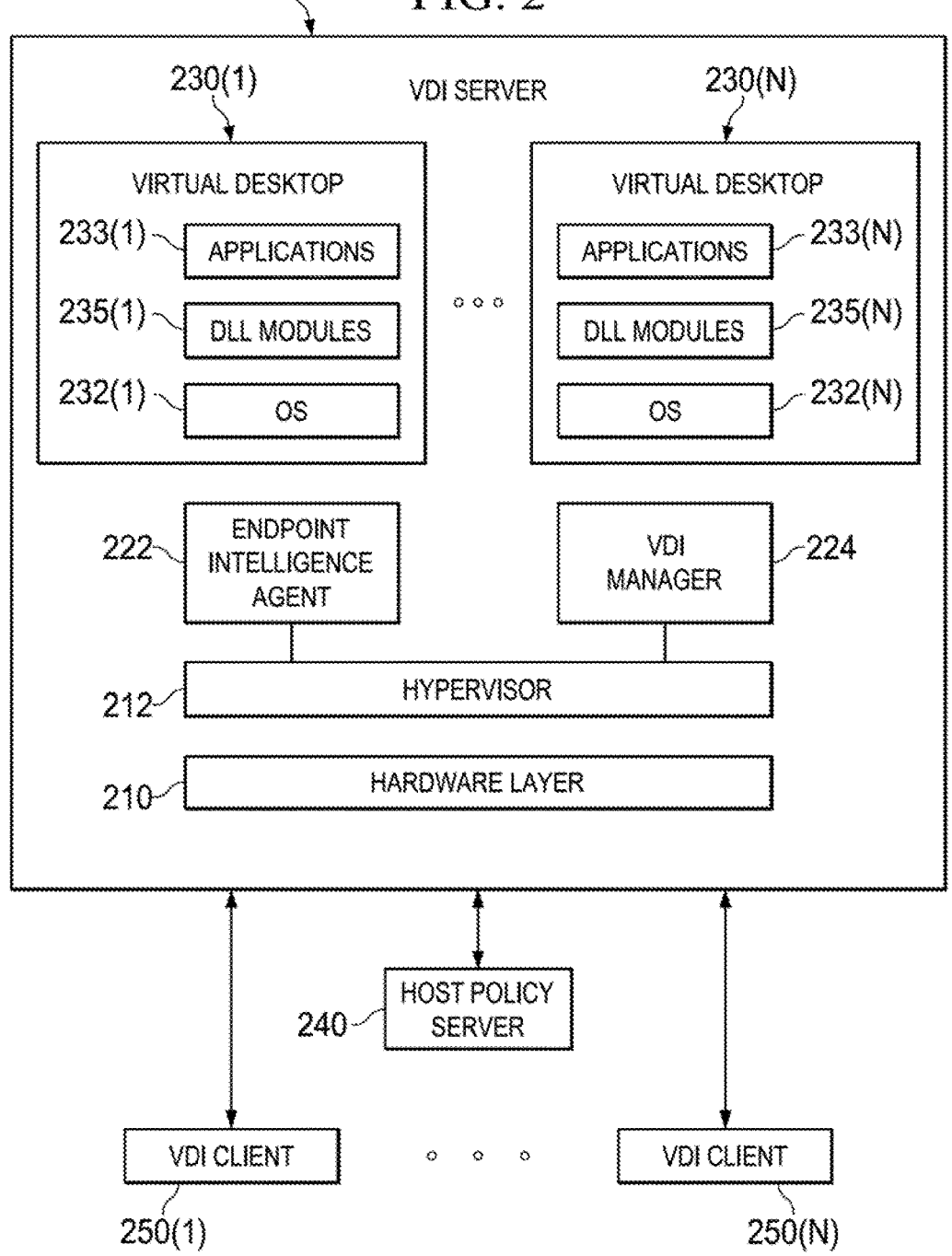
FIG. 2 is a simplified block diagram of a virtual desktop infrastructure that may be implemented in another embodiment of the computing system for blocking malicious applications in accordance with the present disclosure.

Turning to FIG. 2, an alternative implementation could include a virtual desktop infrastructure (VDI) configured in computing system 100, in either the out-of-band embodiment (e.g., network 112) or the in-line embodiment (e.g., network 114). In an example VDI implementation, based on a VDI-in-a-Box configuration, one or more centralized servers, such as VDI server 200, can run a VDI manager 224 to deliver centrally-managed virtual desktops 230(1)-230(N) on multiple clients 250(1)-250(N) (e.g., hosts or other computing devices). For example, Management Server may be configured as a centralized server to manage multiple clients implemented with personalized desktops. VDI clients 250 (1)-250(N) accessing the VDI infrastructure can be configured in a multi-user login system and have the network address (e.g., IP address) of VDI server 200. Each of the clients 250(1)-250(N) may authenticate to VDI server 200 and initiate network communications via VDI server 200. In one example implementation, each client can be configured to access only certain services (e.g., HyperText Transfer Protocol (HTTPS), File Transfer Protocol (FTP), etc.), such that at least some of the clients are capable of accessing different services.

VDI server 200 can be configured with a hardware layer 210 and a hypervisor 212 to host multiple virtual desktops 230(1)-230(N). Hardware layer 210 can be configured with suitable processing and memory elements. The virtual desktops can have their own operating systems 232(1)-232(N), applications 233(1)-233(N), and DLL modules 235(1)-235 (N). Hypervisor 212 can run virtual desktops 230(1)-230(N) as guest machines and can manage the execution of the guest operating systems 212(1)-212(N).

An endpoint intelligence agent 222 can also be configured on VDI server 200, and can perform the same or similar functionality as described with reference to endpoint intelligence agent 132 of end host 130. In the embodiment of FIG. 2, however, endpoint intelligence agent 222 may be configured to provide endpoint intelligence functions for each of the virtual desktops 230(1)-230(N) on VDI server 200. When a network access attempt is made by one of the VDI clients, endpoint intelligence agent 222 of VDI server 200 can provide metadata and application information from the corresponding virtual desktop to an endpoint intelligence server of a network security device, such as endpoint intelligence server 152 of network security device 150 shown and described in FIG. 1. When the network security device determines an application should be blocked, the application's reputation score and action information can be sent to endpoint intelligence agent 222, which can block network traffic associated with the application at VDI server 200.

Although FIG. 2 illustrates a VDI implementation based on a VDI-in-a-Box configuration, embodiments described herein may also be applied to traditional VDI configurations. In a traditional VDI configuration, Management Servers may be configured as a 'middleman' with multiple virtual desktops running behind the Management Servers. Endpoint intelligence agent 222 and host policy server 240 are still configured in a VDI server in a traditional VDI implementation.

Figure 3:
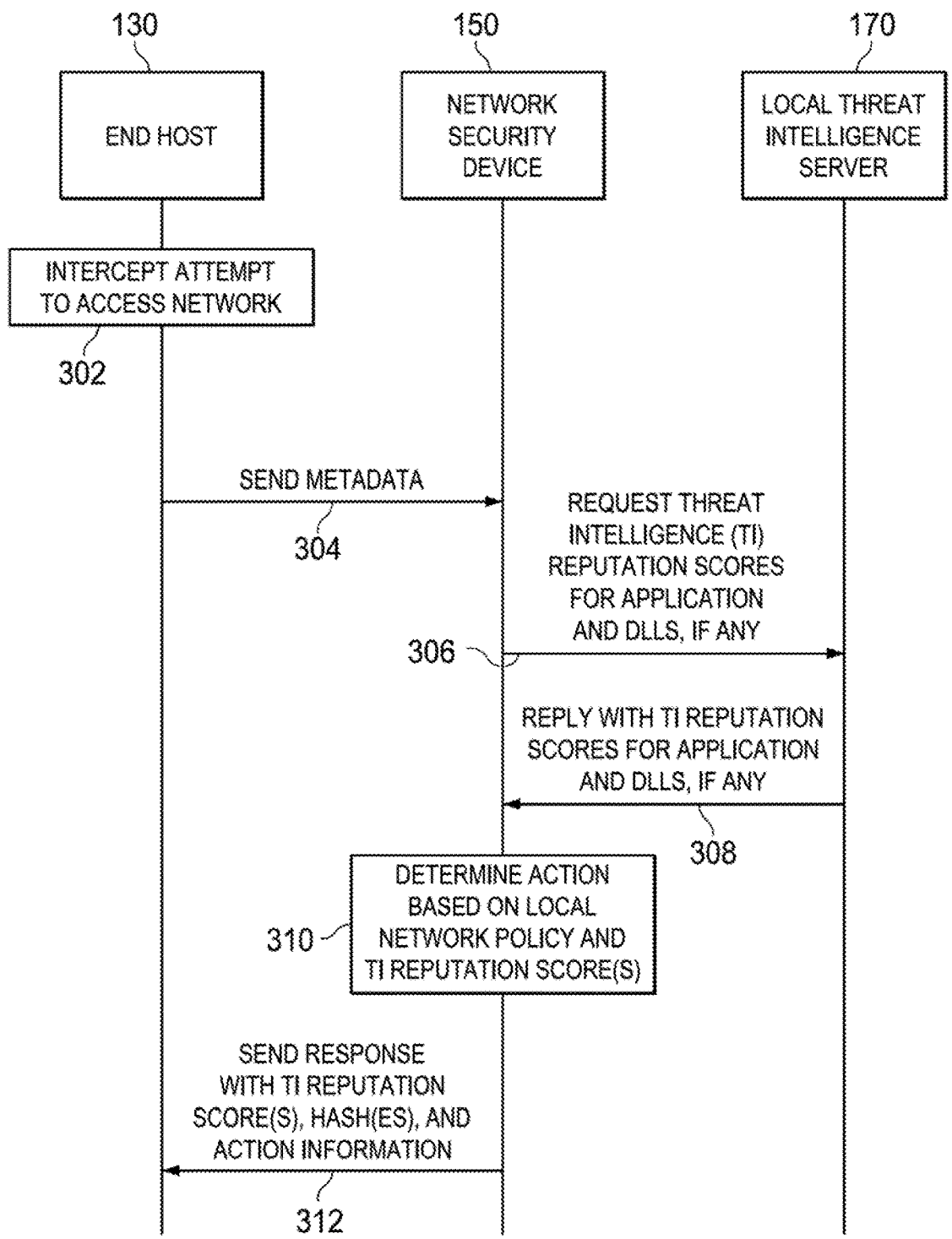
FIG. 3 is a simplified interaction diagram illustrating possible operations in a malicious application blocking system according to at least one embodiment.

Turning to FIG. 3, a simplified interaction diagram illustrates one scenario of possible interactions that may occur in computing system 100 between end host 130, network security device 150, and local threat intelligence server 170, according to at least one embodiment. The scenario of FIG. 3 illustrates potential interactions and activities that may occur when an application on end host 130 is blocked based on a bad TI reputation score. In at least one embodiment, endpoint intelligent agent 132 could perform one or more interactions and activities associated with end host 130, and endpoint intelligent server 152 could perform one or more interactions and activities associated with network security device 150. The example of FIG. 3 is merely an example of potential interactions, and does not limit the scope of the claims. For example, number of modules may vary, number of components may vary, specific interactions may vary, order of interactions may vary, etc.

Initially, a process corresponding to an application on end host 130 may trigger network activity. At 302, end host 130 may intercept an attempt to access a network. A network access attempt can be an attempt by a process, which is an instance of an executing application, to make a network connection to a destination node. The destination node could be another host (or other network device capable of establishing a network session) within a local area network, or in another network. Examples of a network access attempt could include, but are not limited to, an attempt to send an email message to a destination node, an attempt to connect to a destination node to download a file, an attempt to access remote nodes (e.g., web servers) via the Internet by opening a web browser, etc.

At 304, end host 130 sends, to network security device 150, metadata associated with the process and network access attempt on end host 130. The metadata includes a tuple of connection information, which includes the network address (e.g., IP address) and port of end host 130, the network address (e.g., IP address) and port of the destination node, and the protocol used (e.g., TCP/IP). The metadata also includes a hash of the application associated with the process, and hashes of dynamic link library modules, if any, loaded by the process.

In at least one embodiment, the metadata could further include one or more of a security identifier (SID), user name/identifier, domain, application name and file path (AppPath), endpoint application reputation (AppReputation), dynamic link library (DLL) reputation (DLLReputation), endpoint reputation score (MD5ConfidenceScore), application category, process name, parent process name, TI reputation score (MD5GTIScore), particular information about the application or its loaded modules, etc. Endpoint reputation score may be included if end host 130 determines the score based on heuristic algorithms, before the metadata is sent to network security device 150. The TI reputation score may be provided in the metadata if the application was previously evaluated by network security device 150 and its TI reputation score was locally cached by end host 130, or is otherwise accessible to end host 130.

At some point, end host 130 may release the connection and initiate the network session with the desired destination node. The session may be initiated to avoid session timeout on end host 130. While the connection is being held, however, end host 130 may attempt to determine an endpoint reputation score to include in the metadata. In at least one embodiment, the endpoint reputation score may be determined to enable end host 130 to proactively create rules for the application on end host 130, before the network session is initiated, based on configured policies, for example, from host policy server 140. The endpoint reputation score may be based on heuristics algorithms that evaluate the application and any DLL modules that may be loaded in the process. For example, DLL modules may be evaluated to determine whether they are expected modules for the particular application being executed. A rule can be created on end host 130 based on the endpoint reputation score and one or more local host policies, for example, from local host policy server 140. Even if a rule is proactively created on end host 130, the metadata can still be sent to network security device 150 at 304, for evaluation. Once the metadata is sent to network security device 150, as shown at 304, the connection may be released.

At 306, network security device 150 queries local threat intelligence server 170 for a TI reputation score of the application. Network security device 150 may also query local threat intelligence server 170 for TI reputation scores of DLL modules, if any. Network security device 150 can send the application hash, and hashes of DLL modules, if any, to threat intelligence server 170 to obtain TI reputation scores. At 308, threat intelligence server 170 can reply back to network security device 150 with a TI reputation score based on the hash of the application, and TI reputation scores based on the hashes of the DLL modules, if any. Depending on the particular implementation, queries and responses for the TI reputation scores of an application and one or more DLL modules may be combined or separate. If local threat intelligence server 170 is unable to provide a TI reputation score (e.g., hash is unknown or server is not available), then in at least one embodiment, network security device 150 may query another source, such as cloud threat intelligence servers 120.

At 310, network security device 150 may use the reputation score (or scores) to determine an action to be taken based on local network policy, for example, from local network policy server 154. The policy may be identified based on the hash of the particular application (or DLL module) corresponding to the TI reputation score or combination of scores being evaluated. A policy may set a particular threshold limit for the TI reputation score of an application, one or more DLL modules, or any desired combination thereof. The action can be determined based on the particular threshold limit and the actual TI reputation score being evaluated. For example, the policy may set a threshold limit of 4, and any application or DLL module having a score less than 4 is to be blocked. In another example, a policy may require blocking an application if two or more of its DLL modules are less than a particular threshold limit, or possibly blocking only the DLL modules.

At 312, network security device 150 may send a response to end host 130. The response may include the TI reputation score (or scores), corresponding hash (or hashes), and action information that indicates the action to be taken including, but not limited to, blocking the application, blocking one or more DLL modules, allowing the application, quarantining the application, quarantining one or more DLL modules, blocking on-going traffic, etc. If a policy violation has occurred and the action to be taken is a blocking action, then network security device 150 can notify end host 130, for example via the action information, to create a rule to block the application from making future network connections, based on the application hash, or to block one or more DLL modules based on their hashes. End host 130 can create a rule to block the particular application or DLL modules in accordance with the action information from network security device 150.

If network security device 150 is an out-of-band device, then network security device 150 can also notify end host 130, for example via the action information, to block the on-going traffic based on the tuple of connection information and the application hash. If network security device 150 is an in-line device, however, it may not necessarily notify end host 130 to drop on-going traffic, because network security device 150 can drop the on-going traffic itself based on the tuple of connection information.

Network security device 150 can also raise an alert to notify a network administrator about which application and/or DLL modules on which end host has initiated a particular network connection. The TI reputation scores and/or the action information sent to end host 130, along with other desired metadata, may be provided in the alert. This information can help the administrator pinpoint the infected application, process, and/or DLL module immediately.

Figure 4:
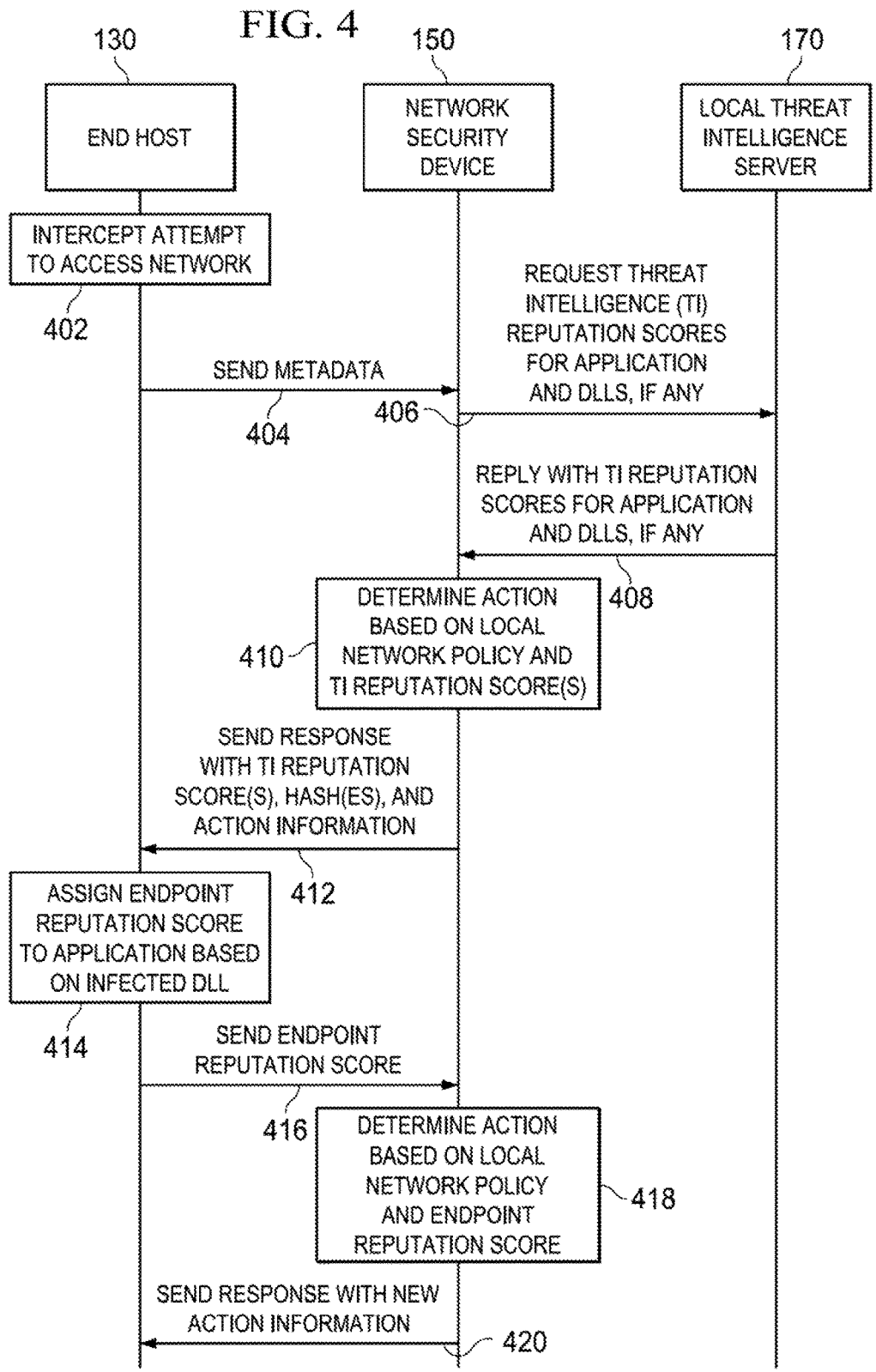
FIG. 4 is a simplified interaction diagram illustrating further possible operations in a malicious application blocking system according to at least one embodiment.

Turning to FIG. 4, a simplified interaction diagram illustrates one scenario of possible communications that may occur in computing system 100 between end host 130, network security device 150, and threat intelligence server 170, according to at least one embodiment. The scenario of FIG. 4 illustrates potential interactions and activities that may occur when an application on end host 130 is blocked based on a bad endpoint reputation score. In at least one embodiment, endpoint intelligent agent 132 could perform one or more interactions and activities associated with end host 130, and endpoint intelligent server 152 could perform one or more interactions and activities associated with network security device 150. The example of FIG. 4 is merely an example of potential interactions, and does not limit the scope of the claims. For example, number of modules may vary, number of components may vary, specific interactions may vary, order of interactions may vary, etc.

The interactions and activities indicated at 402, 404, 406, 408, and 410 of FIG. 4, are generally the same as the interactions and activities of FIG. 3, shown and described with reference to 302, 304, 306, 308, and 310. Accordingly, the interactions and activities indicated at 402, 404, 406, 408, and 410 of FIG. 4 can be understood with reference to the description and illustrations of interactions and activities indicated at 302, 304, 306, 308, and 310 of FIG. 3.

At 412, network security device 150 may send a response to end host 130. The response can include the TI reputation score (or scores), corresponding hash (or hashes), and action information indicating the action to be taken. In the example scenario of FIG. 4, the application and any DLL modules do not violate any policies. Accordingly, the action information sent to end host 130 at 412, indicates the action to be taken is to allow a network session established by a process associated with the application and DLL modules, if any, to continue.

At 414, end host 130 may categorize the application as 'malicious', or any other suitable categorization that indicates the application has become a threat and may be, or is, infected with malware. The categorization can be based on one or more DLL modules that are determined by end host 130 to be infected (i.e., contain malware). For example, after network security device 150 notifies end host 130 that the application is allowed (i.e., at 412), network traffic can continue to flow in the established network session. A DLL module loaded by the process could potentially become a threat if malware is successfully downloaded and executed on end host 130 after the network traffic is approved at 412. In this case, end host 130 may use one or more heuristics algorithms to determine whether a particular DLL module has been infected.

In another scenario, when network security device 150 is unable to obtain a threat intelligence reputation scores (e.g., threat intelligence servers are down) and an endpoint reputation score was not sent with the metadata initially at 404, then action information may indicate that the TI reputation score is unknown. In this case, end host 130 may use one or more heuristic algorithms to determine whether one or more DLL modules are appropriate and/or required for the particular application associated with the network traffic.

If end host 130 determines that a DLL module has been infected or is otherwise a threat, then end host 130 can assign an endpoint reputation score to the application indicating the application has been categorized as 'malicious' based on one or more DLL modules that were invoked by the process. In at least one embodiment, the endpoint reputation score could be a numerical value that represents a degree of maliciousness or criticality of the application and/or DLL modules according to the heuristics algorithms. At 416, end host 130 may send the endpoint reputation score, along with hashes of the application and DLL modules, to network security device 150.

At 418, network security device 150 can use the endpoint reputation score to determine an action to be taken based on local network policy, for example, from local network policy server 154. A policy may set a particular threshold limit for the endpoint reputation score of an application. The action can be determined based on the particular threshold limit and the actual endpoint reputation score being evaluated.

At 420, network security device 150 may send a response to end host 130. The response can include the hash (or hashes) of the application and/or DLL modules, and new action information that indicates the action to be taken. The action can include, but is not limited to, blocking the application, blocking one or more DLL modules, allowing the application, quarantining the application, quarantining one or more DLL modules, blocking on-going traffic, etc. If a policy violation has occurred based on the endpoint reputation score and the action to be taken is a blocking action, then network security device 150 can notify end host 130, for example via the action information, to create a rule to block the application from making future network connections, based on the application hash, or to block one or more DLL modules based on their hashes. End host 130 can create a rule to block the particular application or DLL modules in accordance with the action information from network security device 150.

If network security device 150 is an out-of-band device, then network security device 150 can also notify end host 130, for example via the new action information, to block the on-going traffic based on the tuple of connection information and the application hash. If network security device 150 is an in-line device, however, it may not necessarily notify end host 130 to drop on-going traffic, because network security device 150 can drop the on-going traffic itself based on the tuple of connection information Network security device 150 can also raise an alert to notify a network administrator about which application and/or DLL module on which end host has initiated the particular network connection. The endpoint reputation score and/or the new action information sent to end host 130, along with other desired metadata, may be provided in the alert. This information can help the administrator pinpoint the infected application, process, and/or DLL module immediately.

Figure 5:
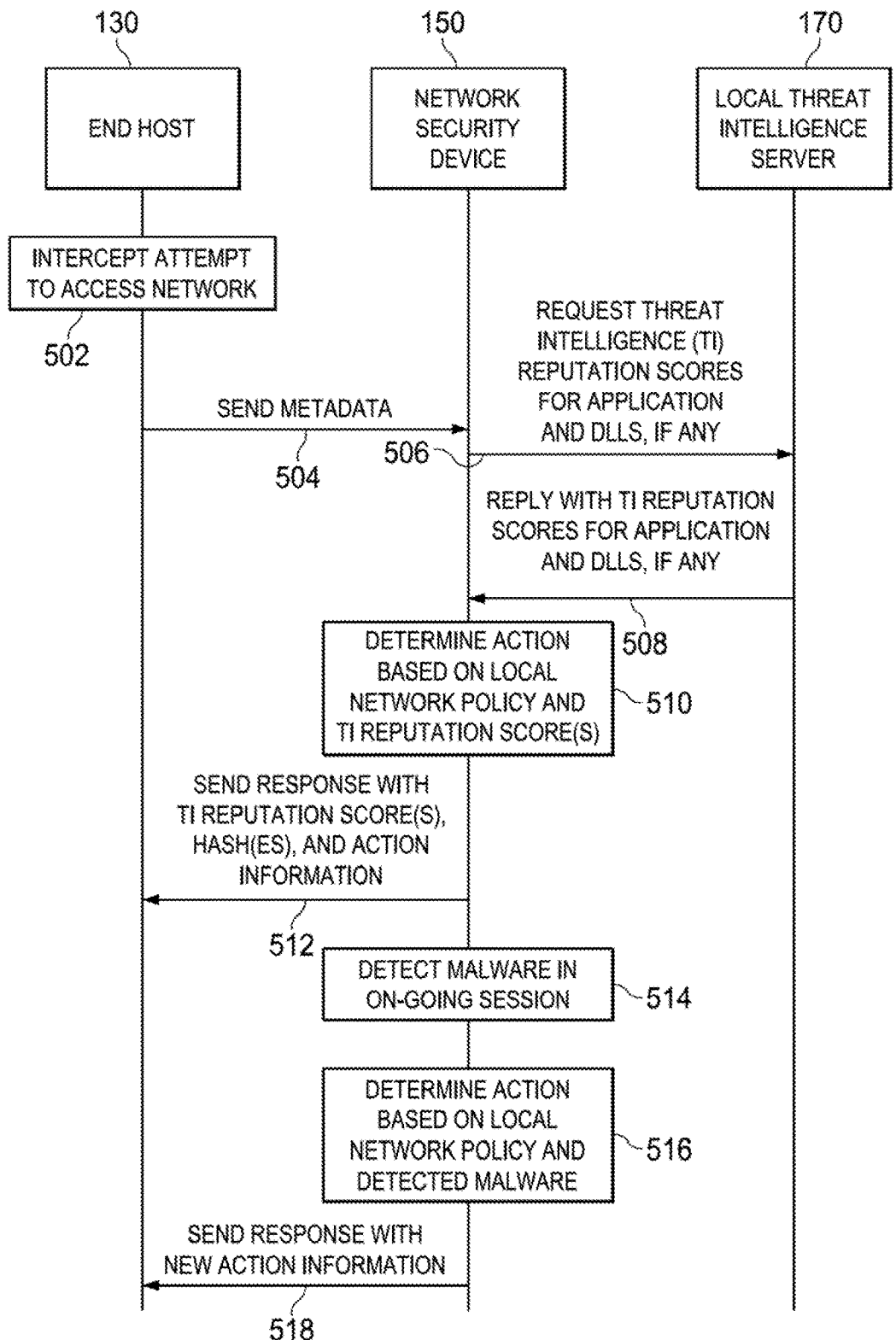
FIG. 5 is a simplified interaction diagram illustrating yet further possible operations in a malicious application blocking system according to at least one embodiment.

Turning to FIG. 5, a simplified interaction diagram illustrates one scenario of possible communications that may occur in computing system 100 between end host 130, network security device 150, and threat intelligence server 170, according to at least one embodiment. The scenario of FIG. 5 illustrates potential interactions and activities that may occur when an application on end host 130 is blocked when it is attempting to download malware onto end host 130. In at least one embodiment, endpoint intelligent agent 132 could perform one or more interactions and activities associated with end host 130, and endpoint intelligent server 152 could perform one or more interactions and activities associated with network security device 150. The example of FIG. 5 is merely an example of potential interactions, and does not limit the scope of the claims. For example, number of modules may vary, number of components may vary, specific interactions may vary, order of interactions may vary, etc.

The interactions and activities indicated at 502, 504, 506, 508, and 510 of FIG. 5, are generally the same as the interactions and activities of FIG. 3, shown and described with reference to 302, 304, 306, 308, and 310. Accordingly, the interactions and activities indicated at 502, 504, 506, 508, and 510 of FIG. 5 can be understood with reference to the description and illustrations of interactions and activities indicated at 302, 304, 306, 308, and 310 of FIG. 3.

At 512, network security device 150 may send a response to end host 130. The response can include the TI reputation score (or scores), corresponding hash (or hashes), and action information indicating the action to be taken. In the example scenario of FIG. 5, the application and any DLL modules do not violate any policies. Accordingly, the action information sent to end host 130 at 512, indicates the action to be taken is to allow a network session established by a process associated with the application and DLL modules, if any, to continue.

During the network session, network device 150 can correlate the tuple of connection information from the metadata received from end host 130, to network traffic it receives. This enables network device 150 to identify the end host and application associated with the network traffic. Network device 150 can also be configured to perform any malware detection functions (e.g., virus scanning, intrusion protection techniques, etc.) on the network traffic. Accordingly, at 514, network device 150 can detect malware in network traffic of the on-going session. The network traffic can be correlated with the tuple of connection information, enabling identification of end host 130 and the particular application associated with the network traffic.

At 516, network security device 150 can determine an action to be taken based on the malware detected and local network policy, for example, from local network policy server 154. A policy may set particular actions to be taken depending upon what type of malware detection occurred.

At 518, network security device 150 may send a response to end host 130. The response can include the hash (or hashes) of the application and/or DLL modules, if any, and new action information that indicates the action to be taken. If a policy violation has occurred based on the malware detected by network security device 150 and the action to be taken is a blocking action, then network security device 150 can notify end host 130, for example via the action information, to create a rule to block the application from making future network connections, based on the application hash, or to block one or more DLL modules based on their hashes. End host 130 can create a rule to block the particular application or DLL modules in accordance with the action information from network security device 150.

If network security device 150 is an out-of-band device, then network security device 150 can also notify end host 130, for example via the new action information, to block the on-going traffic based on the tuple of connection information and the application hash. If network security device 150 is an in-line device, however, it may not necessarily notify end host 130 to drop on-going traffic, because network security device 150 can drop the on-going traffic itself based on the tuple of connection information. Network security device 150 can also raise an alert to notify a network administrator about the detected malware and/or the new action information sent to end host 130.

Figure 6B:
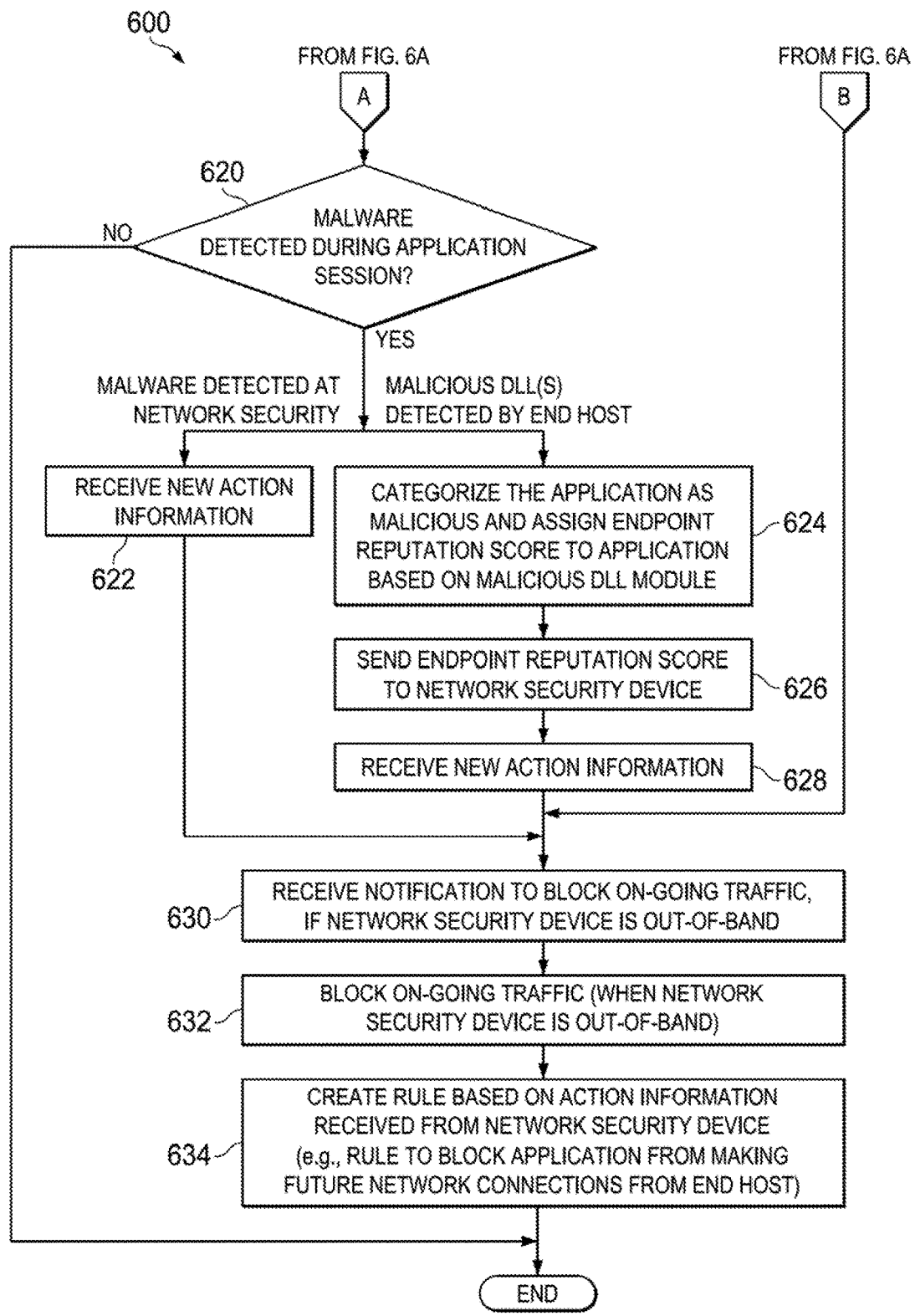

FIGS. 6A-6B show a simplified flowchart of a flow 600 illustrating activities associated with blocking malicious applications on an end host in computing system 100 according to an embodiment. A set of operations may correspond to the activities of FIGS. 6A-6B. In an embodiment, endpoint intelligence agent 132 of end host 130 may perform at least some of the operations.

Initially, a process corresponding to an application (e.g., of applications 133) on end host 130 may trigger network traffic, for example, by initiating a web browser. At 602, end host 130 may intercept the attempt to access a network (e.g., an attempt to send an email message to a destination node, an attempt to connect to a destination node to download a file, an attempt to access remote nodes (e.g., web servers) via the Internet by opening a web browser, etc.). The connection may be held for a period of time that does not cause the session to time out.

At 604, while the connection is being held, end host 130 may attempt to determine an endpoint reputation score of the application. End host 130 can perform one or more heuristic algorithms to determine an appropriate endpoint reputation score. In at least one embodiment, a heuristic algorithm can be used to determine whether one or more DLL modules are appropriate and/or required for the particular application associated with the network traffic. In particular, it can be determined whether the DLL modules being invoked are related to other applications or to system DLL modules. For example, use of operating system DLL modules may indicate the application is trying to make unauthorized modifications or trying to communicate with other devices via a network connection.

If an endpoint reputation score is successfully calculated, then locally configured policies may be applied if appropriate. For example, for certain endpoint reputation scores (e.g., indicating a certain degree of maliciousness), a local host policy may be configured (e.g., in host policy server 140) to provide for blocking the current network access request and for blocking the application from making any future network connections. The local host policy could also, or alternatively, block one or more DLL modules associated with the application. The local host policy application may be especially advantageous when network security device 150 is inaccessible or otherwise unreachable by end host 130.

At 606, end host 130 sends, to network security device 150, metadata associated with the process and network access attempt on end host 130, as previously described herein. The metadata includes a tuple of connection information, a hash of the application associated with the process, and hashes of dynamic link library modules, if any, loaded by the process. The metadata could further include one or more of a security identifier (SID), user name/identifier, domain, application name and file path (AppPath), endpoint application reputation (AppReputation), dynamic link library (DLL) reputation (DLLReputation), application category, process name, parent process name, etc. The endpoint reputation score (MD5ConfidenceScore) may also be included in the metadata if it was successfully calculated at 604. In addition, if the endpoint reputation score was successfully calculated and resulted in an action being taken (e.g., blocking or quarantining the application and/or DLL module(s)) according to local host policy, then the particular action that was taken may also be reported to network security device 150.

If a TI reputation score for the application was determined by network security device 150 during a previous network access attempt, then end host 130 may have the previously received the TI reputation score, which may be cached or otherwise accessible to end host 130. If a predetermined time period for caching the TI reputation score has not expired, then end host 130 may add the cached TI reputation score to the metadata to send to network security device 150. If the predetermined time period has expired, however, then the cached TI reputation score may not be sent to network security device 150. In this case, at 608, end host 130 may request a new TI reputation score for the application (and TI scores for any associated DLL modules) from network security device 150. In at least one embodiment, this request may be integrated with sending the metadata to network security device 150. For example, network security device 150 may be configured to obtain a new TI reputation score if none is received in the metadata.

At 610, end host 130 may release the connection and initiate a network session with the desired destination node. The session may be initiated to avoid session timeout on end host 130. At 612, end host 130 receives a TI reputation score and hash of the application. End host 130 can also receive TI reputation scores and hashes of DLL modules, if any. At 614, end host 130 determines the action to take indicated by the received action information. End host 130 may also cache TI reputation scores of the application and DLL modules, if any, and restart a timer used to evaluate the predetermined time period allowed for caching TI reputation scores.

If the action to be taken is an allow action, as indicated at 616, then end host 103 allows the established network session to continue, as indicated at 618. If the network session ends without any malware being detected, as indicated at 620, then flow 600 ends.

During the network session, however, malware may be detected in at least two different scenarios, as indicated at 620. First, malware may be detected, for example, in the on-going network traffic of the network session that is received at network security device 150. If malware is detected at network security device 150, then at 622, end host 130 receives a response including new action information and a hash of the application (and possibly hashes of DLL modules, if any) from network security device 150.

In a second scenario, one or more DLL modules loaded by the executing process may be determined to be malicious. End host 130 may use one or more heuristic algorithms to determine whether a particular DLL module is malicious. For example, the heuristic algorithms could evaluate whether the DLL module has been infected with malware or whether the DLL module is appropriate and/or required for the particular application associated with the network session. If end host 130 determines that a DLL module is malicious, then at 624, end host 130 can categorize the application as malicious and assign an endpoint reputation score to the application based on the malicious DLL module.

In at least one embodiment, when an endpoint reputation score has been assigned to an application on end host 130, a local host policy may be configured (e.g., in host policy server 140) to provide for blocking on-going network traffic of the network session and/or blocking future network connections by the application. Such actions may be determined based on a comparison of a threshold limit of the local host policy to the endpoint reputation score. Local host policies may be especially advantageous when network security device 150 is inaccessible or otherwise unreachable by end host 130 and a TI reputation score is not received in the response at 612.

At 626, end host 130 can send the endpoint reputation score and the hash of the application to network security device 150. In addition, if the endpoint reputation score resulted in an action being taken (e.g., blocking or quarantining the application or DLL module(s)) on end host 130 according to local host policy, then the particular action that was taken may also be reported to network security device 150. At 628, end host 130 receives a response including new action information that indicates the action to be taken and the hash (or hashes) of the application or DLL modules to which the action applies. The action to be taken may be determined by network security device 150 based on the endpoint reputation score, local network policy, and possibly whether action has already been taken on the end host based on its local host policy. Once end host 130 receives new action information at 622 or 628, or if the action indicated in action information previously received at 612 is not an allow action (as indicated at 616), flow may pass to 630. At 630, end host 130 may receive notification to block on-going traffic of the network session if network security device 150 is out-of-band. This notification may be received, for example, from new action information (e.g., 622, 628) or from first action information (e.g., 612) in the response from network security device 150. In other embodiments, this notification may be sent separately from the response. At 632, end host 130 blocks on-going traffic of the network session, if the notification to block on-going traffic was received.

At 634, end host 130 may create a rule based on the particular action information and hash (or hashes) received in the most recent response from network security device 150. For example, a rule may be created to block the application or one or more DLL modules from making future network connections from end host 130 if the action information indicates a blocking action. In at least one embodiment, a rule to block an application or DLL module can be configured to prevent the application or DLL module, based on its hash, from executing. In another example, a rule may be created to quarantine the application or DLL module if the action information indicates a quarantining action. In at least one embodiment, a rule to quarantine an application or DLL module can be configured to allow the application or DLL module, based on a received hash, to execute, but to prevent the application or DLL module from establishing a network session. In addition, these rules may be created for multiple DLL modules in some instances, when multiple hashes are received with action information indicating a the action is to be taken on the multiple DLL modules. Furthermore, when an application is blocked, its associated DLL modules are also prevented from executing with the application. When an application is quarantined, its associated DLL modules are also quarantined when loaded by a process invoked from the application. In yet another embodiment, the local network policy could be configured to allow an application even if a policy was violated (e.g., bad TI reputation score, bad endpoint reputation score, malware detected). In these scenarios, the application is not blocked or quarantined and is allowed to make future network connections, assuming the policy doesn't change.

Figure 7B:
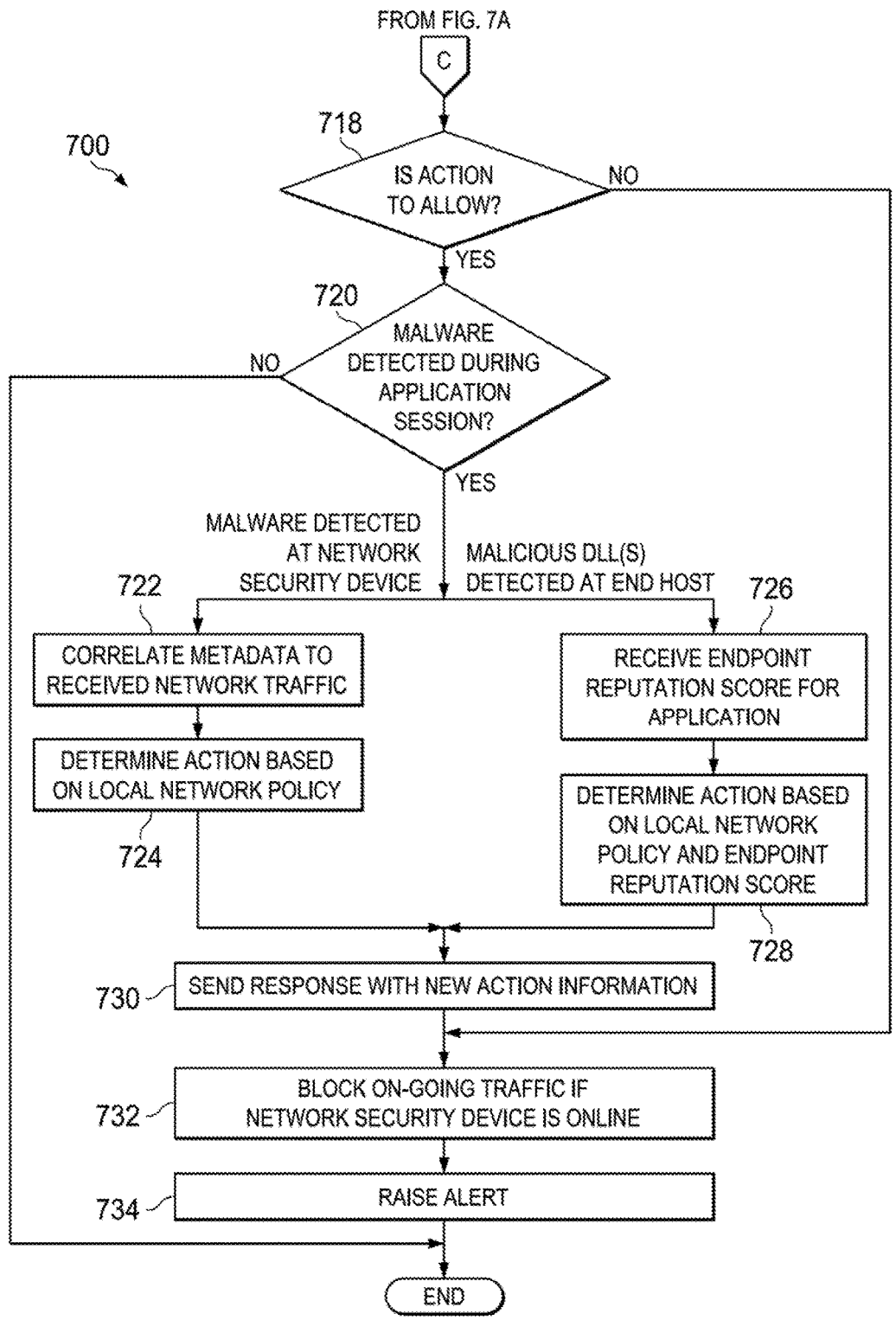

FIGS. 7A-7B show a simplified flowchart of a flow 700 illustrating activities associated with blocking malicious applications on an end host in computing system 100 according to an embodiment. A set of operations may correspond to the activities of FIGS. 7A-7B. In an embodiment, endpoint intelligence server 152 of network security device 150 may perform at least some of the operations.

At 702, network security device 150 receives metadata associated with a process that initiated a network access attempt on end host 130. The process is an instance of an executing application (e.g., of applications 133) on end host 130. The metadata can include information related to the network access attempt, such as a tuple of connection information. The metadata can also include information related to the corresponding application such as a hash of the application, and hashes of dynamic link library modules, if any, loaded by the process. The metadata could further include one or more of a security identifier (SID), user name/identifier, domain, application name and file path (AppPath), endpoint application reputation (AppReputation), dynamic link library (DLL) reputation (DLLReputation), application category, process name, parent process name, etc. The endpoint reputation score (MD5ConfidenceScore) may also be included in the metadata if it was successfully calculated by end host 130.

At 704, a determination is made as to whether a TI reputation score was requested by end host 130. TI reputation scores may be requested for an application and its DLL modules when any of the TI reputation scores have not previously been determined by network security device 150 for end host 130. TI reputation scores may also be requested when a predetermined time period for caching the TI reputation scores has expired. In at least one embodiment, the TI reputation scores can be requested by not including them in the metadata sent to network security device 150.

If the TI reputation scores are not requested by end host 130, then at 712, the TI scores can be retrieved from the metadata. If the TI reputation scores are requested, however, then at 706, network security device 150 queries local threat intelligence server 170 for a TI reputation score of the application, based on a hash of the application. Network security device 150 may also query local threat intelligence server 170 for TI reputation scores of DLL modules, if any, based on the hashes of the DLL modules. Depending on the particular implementation, queries and responses for the TI reputation scores of an application and one or more DLL modules may be combined or separate. If local threat intelligence server 170 is unable to provide a TI reputation score (e.g., hash is unknown or server is not available), then in at least one embodiment, network security device 150 or threat intelligence server 170 may query another source, such as cloud threat intelligence servers 120.

If it is determined at 708, that the TI reputation score or scores are not received from local threat intelligence server 170 (or from any other source), then at 710, endpoint reputation score can be retrieved from the metadata, if available. After one or more TI reputation scores or an endpoint reputation score is obtained, then at 714, network security device 150 may use the particular reputation score (or scores) to determine an action to be taken based on local network policy. The policy may be identified, for example in local network policy server 154, based on the hash of the application (or DLL module) corresponding to the particular reputation score or combination of scores being evaluated. For evaluations of TI reputation scores, a policy may set a particular threshold limit for the TI reputation score of an application, for each DLL module, or any desired combination thereof. For evaluations of an endpoint reputation score, a policy may set a particular threshold limit for the endpoint reputation score. The action can be determined based on the particular threshold limit and the actual TI reputation score or endpoint reputation score being evaluated. For example, a blocking action may be selected for an application when a TI reputation score (or endpoint reputation score) represents at least a certain degree of maliciousness set by a policy as the threshold limit for the application. In another example, an allow action may be selected when the TI reputation score (or endpoint reputation score) does not represent at least the certain degree of maliciousness set by the policy as the threshold limit for the application.

In at least one embodiment, administrator whitelist or blacklist classifications of a particular application or DLL module can override a TI reputation score or endpoint reputation score. For example, a check can be done as to whether the hash of an application or DLL module is on an administrator whitelist or a blacklist. If the hash of the application or DLL module is found on an administrator whitelist, then the particular application or DLL module may be classified (e.g., as white, benign, good, safe, etc.) to indicate it is known to be free of malware. In this instance, the whitelisted application or DLL module can be allowed to run irrespective of its reputation scores. If a hash of the application or DLL module is found on an administrator blacklist, however, then the application or DLL module may be classified (e.g., as black, bad, malicious, etc.) to indicate it is known malware. In this instance, the blacklisted application or DLL module can be blocked irrespective of its reputation scores. Additionally, if a DLL module is classified as malicious based on the administrator blacklist, then its associated application may also be classified as malicious in at least some embodiments. The action information can be sent to end host 130 and flow can pass to 718.

At 716, network security device 150 may send a response to end host 130. The response can include the TI reputation score (or scores) or the endpoint reputation score, the corresponding hash (or hashes), and action information that indicates what action is to be taken including, but not limited to, blocking the application, blocking one or more DLL modules, allowing the application, quarantining the application, quarantining one or more DLL modules, etc. The action information could also indicate blocking on-going traffic of the network session. If a policy violation has occurred, then the particular action information communicated from network security device 150 to end host 130 may depend upon whether network security device 150 is in-line or out-of-band. If network security device 150 is an out-of-band device and a policy violation has occurred, then network security device 150 can notify end host 130, for example via the action information, to block the on-going traffic based on the tuple of connection information and the application hash. When network security device 150 is an in-line device, however, it may not necessarily notify end host 130 to drop on-going traffic, because network security device 150 can drop the on-going traffic based on the tuple of connection information received in the metadata from end host 130. Regardless of an in-line or out-of-band implementation, if a policy violation has occurred, network security device 150 can also notify end host 130, for example via the action information, to create a rule to block the application from making future network connections, based on the application hash, or to block one or more DLL modules based on their hashes. In some scenarios, certain policy violations could require a quarantining action to be taken.

If the action to be taken is an allow action, as indicated at 718, then the network session established by the process may be allowed to continue. On-going network traffic of the network session may continue to be received by network security device 150, until the session terminates. If the network session ends without any malware being detected, as indicated at 720, then flow 600 ends.

During the network session, however, malware may be detected in at least two different scenarios, as indicated at 720. First, malware may be detected, for example, in the on-going network traffic of the network session, which is received at network security device 150. Network security device 150 can be configured to perform any malware detection functions (e.g., virus scanning, intrusion protection techniques, etc.) on network traffic it receives. If network security device 150 detects malware in network traffic that is associated with the application on end host 130, then at 722, the network traffic can be correlated with the tuple of connection information, enabling identification of end host 130 and the particular application and process associated with the network traffic.

At 724, network security device 150 can determine an action to be taken based on the malware detected, local network policy, and possibly the hash of the application. The policies may be provided, for example, from local network policy server 154. A policy may specify particular actions to be taken depending upon what type of malware detection occurred and potentially, upon what is desired for the particular application affected. At 730, network security device 150 may send a response to end host 130. The response can include the hash (or hashes) and new action information that indicates the action to be taken including, but not limited to, blocking the application, allowing the application, quarantining the application, etc. In addition, the action to be taken could include blocking on-going traffic, for example, if network security device 150 is out-of-band.

In a second scenario of malware detection that could occur during the allowed network session, one or more DLL modules loaded by the process may be determined to be a threat by end host 130. In this case, network security device 150 receives at 726, an endpoint reputation score for the application. At 728, network security device 150 can use the endpoint reputation score to determine an action to be taken based on local network policy. A policy may set a particular threshold limit (e.g., indicating a certain degree of maliciousness that requires blocking) for the endpoint reputation score of an application. The action can be determined based on the particular threshold limit and the actual endpoint reputation score being evaluated.

At 730, network security device 150 may send a response to end host 130 The response can include the hash (or hashes) and new action information that indicates the action to be taken including, but not limited to, blocking the application, blocking one or more DLL modules, allowing the application, quarantining the application, quarantining one or more DLL modules, etc. In addition, the action to be taken could include blocking on-going traffic, for example, if network security device 150 is out-of-band.

Once new action information has been sent to the end host at 730, or if the action indicated in the action information previously sent is not an allow action (as indicated at 718), flow may pass to 732. At 732, if network security device 150 is in-line, then it can block on-going traffic associated with the application, when the application is not allowed (e.g., blocked, quarantined).

At 734, network security device 150 can raise an alert to notify a network administrator about which application and/or DLL modules on which end host are associated with a policy violation. The TI reputation scores, the endpoint reputation score, and/or the action information sent to end host 130 can be provided to a network administrator in the alert. The alert may also include other metadata information (e.g., file name and path, application reputation, DLL module reputation, user name, SID, etc.) that enables the administrator to identify the particular host, user, and/or application (and DLL modules) at issue. Typically, an alert is raised when a policy violation has occurred (e.g., a threshold limit of a TI reputation score or endpoint reputation score is not met, etc.). However, it will be apparent that alerts could be raised based on any determinations (e.g., TI reputation scores, actions to be taken, etc.) by network security device 150. Alerts can provide important information regarding particular hosts and applications that enable a network administrator to quickly identify a process, application, DLL modules, and end host and to take certain targeted actions, if desired.

Figure 8:
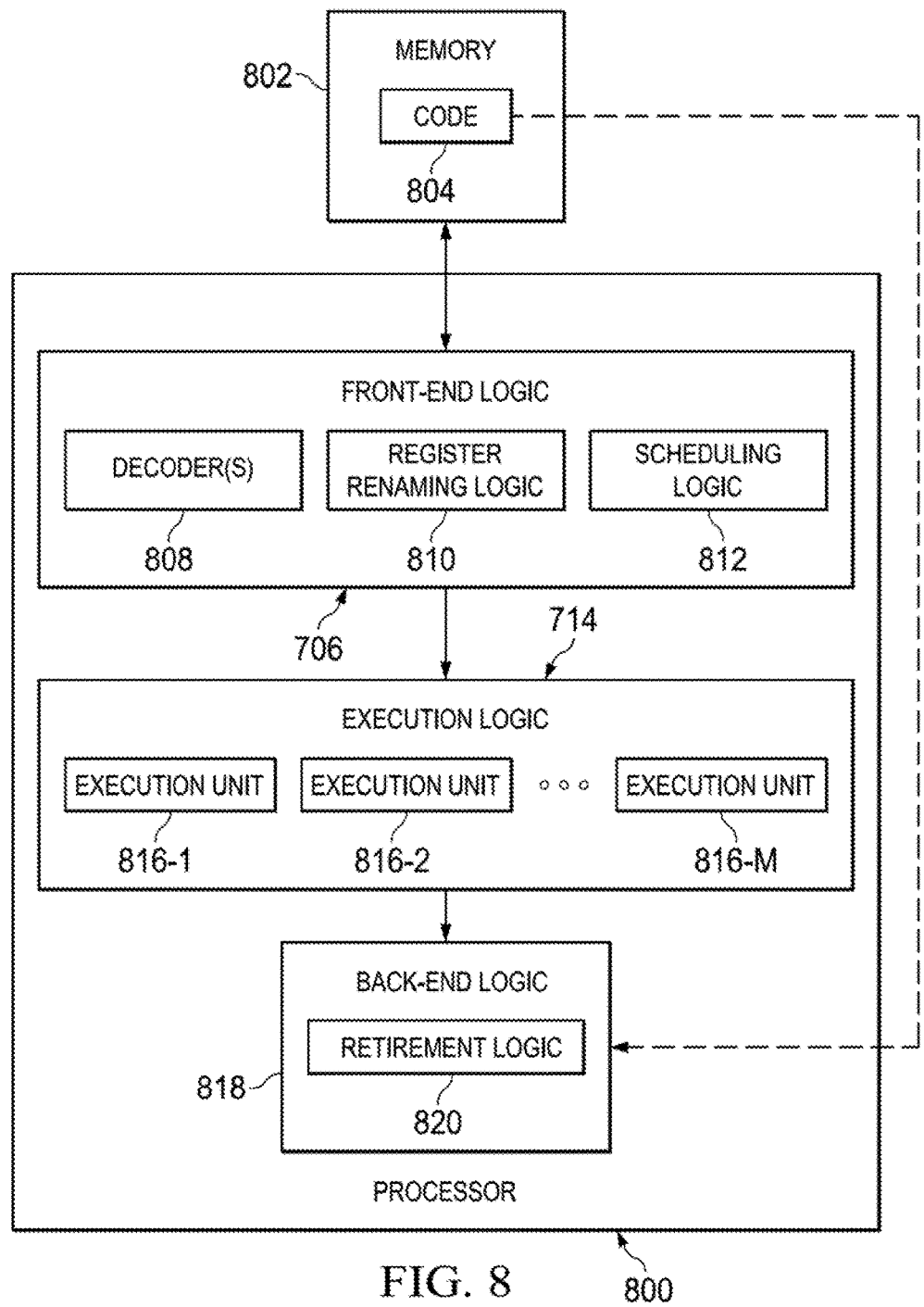
FIG. 8 is a block diagram of a memory coupled to an example processor according to an embodiment.

FIGS. 8-9 are block diagrams of exemplary computer architectures that may be used in accordance with embodiments disclosed herein. Other computer architecture designs known in the art for processors, mobile devices, computing devices, and network elements may also be used. Generally, suitable computer architectures for embodiments disclosed herein can include, but are not limited to, configurations illustrated in FIGS. 8-9.

FIG. 8 is an example illustration of a processor according to an embodiment. Processor 800 is one example of processors 136 and 156 of end host 130 and network security device 150, respectively. Processor 800 is also one example of one or more processors in hardware layer 210 of VDI server 200.

Processor 800 may be any type of processor, such as a microprocessor, an embedded processor, a digital signal processor (DSP), a network processor, a multi-core processor, a single core processor, or other device to execute code. Although only one processor 800 is illustrated in FIG. 8, a processing element may alternatively include more than one of processor 800 illustrated in FIG. 8. Processor 800 may be a single-threaded core or, for at least one embodiment, the processor 800 may be multi-threaded in that it may include more than one hardware thread context (or "logical processor") per core.

FIG. 8 also illustrates a memory 802 coupled to processor 800 in accordance with an embodiment. Memory 802 is one example of memory elements 138 and 158 of end host 130 and network security device 150, respectively. Memory 802 is also one example of one or more memory elements in hardware layer 210 of VDI server 200. Memory 802 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 800 can execute any type of instructions associated with the malicious application blocking operations detailed herein. Generally, processor 800 can transform an element or an article (e.g., data) from one state or thing to another state or thing.

Code 804, which may be one or more instructions to be executed by processor 800, may be stored in memory 802. Code 804 can include instructions of various modules (e.g., endpoint intelligence agent 132, endpoint intelligence server 152) that may be stored in software, hardware, firmware, or any suitable combination thereof, or in any other internal or external component, device, element, or object where appropriate and based on particular needs. In one example, processor 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor 800 can also include execution logic 814 having a set of execution units 816-1 through 816-M. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor 800 allows out of order execution but requires in order retirement of instructions. Retirement logic 820 may take a variety of known forms (e.g., re-order buffers or the like). In this manner, processor 800 is transformed during execution of code 804, at least in terms of the output generated by the decoder, hardware registers and tables utilized by register renaming logic 810, and any registers (not shown) modified by execution logic 814.

Although not shown in FIG. 8, a processing element may include other elements on a chip with processor 800. For example, a processing element may include memory control logic along with processor 800. The processing element may include I/O control logic and/or may include I/O control logic integrated with memory control logic. The processing element may also include one or more caches. In some embodiments, non-volatile memory (such as flash memory or fuses) may also be included on the chip with processor 800.

FIG. 9 illustrates a computing device 900 that is arranged in a point-to-point (PtP) configuration according to an embodiment. In particular, FIG. 9 shows a system where processing elements, memory, and input/output devices are interconnected by a number of point-to-point interfaces. Generally, one or more of the computing devices (e.g., network security device 150, end host 130, VDI server 200, etc.) of computing system 100 may be configured in the same or similar manner as computing device 900.

Processing elements 970 and 980 may also each include integrated memory controller logic (MC) 972 and 982 to communicate with memory elements 932 and 934. In alternative embodiments, memory controller logic 972 and 982 may be discrete logic separate from processing elements 970 and 980. Memory elements 932 and/or 934 may store various data to be used by processing elements 970 and 980 in achieving operations associated with malicious application blocking operations, as outlined herein.

As illustrated in FIG. 9, computing device 900 may include several processing elements, of which only two processing elements 970 and 980 are shown for clarity. While only two processing elements 970 and 980 are shown, it is to be understood that an embodiment of system 900 may also include only one such processing element. Processing elements 970 and 980 may each include a processor core 974a and 984a to execute multiple threads of a program. Processing elements 970 and 980 may also each include integrated memory controller logic (MC) 972 and 982 to communicate with memory elements 932 and 934. The memory elements 932 and/or 934 may store various data. In alternative embodiments, memory controller logic 972 and 982 may be discrete logic separate from processing elements 970 and 980.

Processing elements 970 and 980 may be any type of a processing element (also referred to herein as 'processor'). For example, processing elements 970 and 980 could include processors configured such as those discussed with reference to processor 800 of FIG. 8, and processors 136 and 156 of FIG. 1. Processing elements 970 and 980 may exchange data via a point-to-point (PtP) interface 950 using point-to-point interface circuits 978 and 988, respectively. Processing elements 970 and 980 may each exchange data with a control logic 990 via individual point-to-point interfaces 952 and 954 using point-to-point interface circuits 976, 986, 994, and 998. As shown herein, control logic 990 is separated from processing elements 970 and 980. In an embodiment, however, control logic 990 is integrated on the same chip as processing elements 970 and 980. Also, control logic 990 may be partitioned differently with fewer or more integrated circuits. Additionally, control logic 990 may also exchange data with a high-performance graphics circuit 938 via a high-performance graphics interface 939, using an interface circuit 992, which could be a PtP interface circuit. In an embodiment, control logic 990 may connect to a display 993 through an interface circuit. Display 993 may include, but is not limited to, a liquid crystal display (LCD), a plasma, cathode ray tube (CRT) display, a touch screen, or any other form of visual display device. In alternative embodiments, any or all of the PtP links illustrated in FIG. 9 could be implemented as a multi-drop bus rather than a PtP link.

As shown in FIG. 9, each of processing elements 970 and 980 may be multicore processors, including first and second processor cores (i.e., processor cores 974a and 974b and processor cores 984a and 984b). Such cores may be configured to execute instruction code in a manner similar to that discussed above with reference to FIGS. 1-6. Each processing element 970, 980 may include at least one shared cache 971, 981. Shared caches 971, 981 may store data (e.g., instructions, code) that are utilized by one or more components of processing elements 970, 980, such as cores 974a, 974b, 984a, and 984b.

Control logic 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a keyboard/mouse 912 (or other input devices such as a touch screen, trackball, joystick, etc.), communication devices 926 (such as modems, network interface devices, or other types of communication devices that may communicate through a computer network 960), audio I/O devices 914, and/or a data storage device 928. Data storage device 928 may store code 930, which may be executed by processing elements 970 and/or 980. In alternative embodiments, any portions of the bus architectures could be implemented with one or more PtP links.

Processing elements 970, 980 and memory elements 932, 934 represent a broad range of processing elements, memory elements and other memory arrangements. Such arrangements can include single or multi-core processors of various execution speeds and power consumptions, and memory of various architectures (e.g., with one or more levels of caches) and of various types (e.g., dynamic random access, FLASH, etc.).

The computer system depicted in FIG. 9 is a schematic illustration of an embodiment of a computing system such as end host 130 and network security device 150 that may be utilized to implement various embodiments discussed herein. It will be appreciated that various components of the system depicted in FIG. 9 may be combined in a system-on-a-chip (SoC) architecture or in any other suitable configuration capable of achieving malicious application blocking on end hosts, according to the various embodiments provided herein. For example, embodiments disclosed herein can be incorporated into systems such as, for example, mobile devices such as smart cellular telephones, tablet computers, personal digital assistants, portable gaming devices, etc. It will be appreciated that these mobile devices may be provided with SoC architectures in at least some embodiments. Additionally, any of these components may be partitioned differently than shown or described herein to include greater or fewer integrated circuits still capable of achieving malicious application blocking on an end host according to the present disclosure.

Note that in certain example implementations, the malicious application blocking activities outlined herein may be implemented by logic encoded in one or more tangible machine readable storage media, which may include non-transitory media. For example, the activities outlined herein may be implemented by embedded logic provided in an application specific integrated circuit (ASIC), digital signal processor (DSP) instructions, software (potentially inclusive of object code and source code), firmware, and/or hardware to be executed by a processor 136, 156, or other similar machine, etc. In some of these instances, a memory element 138, 158 can store data used for the operations described herein. This includes memory element 138, 158 being able to store software, logic, code, or processor instructions that are executed to carry out the activities described in this Specification.

A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

The computing elements of computing system 100 (e.g., end host 130, network security device 150, VDI server 200), can include volatile and/or nonvolatile memory elements (e.g., memory elements 138, 158) for storing data and information, including instructions and/or code, to be used in the operations outlined herein. Each of end host 130, network security device 150, and VDI server 200 may keep data and information in any suitable memory element (e.g., random access memory (RAM), read-only memory (ROM), programmable ROM (PROM), erasable PROM (EPROM), electrically EPROM (EEPROM), a disk drive, a floppy disk, a compact disk ROM (CD-ROM), a digital versatile disk (DVD), flash memory, a magneto-optical disk, an application specific integrated circuit (ASIC), or other types of nonvolatile machine readable storage media that are capable of storing data and information), software, hardware, firmware, or in any other suitable component, device, element, or object where appropriate and based on particular needs. Any of the memory items discussed herein (e.g., memory elements 138, 158) should be construed as being encompassed within the broad term 'memory element.' Moreover, the information being used, tracked, sent, or received in computing system 100 could be provided in any repository, database, register, queue, table, cache, control list, or other storage structure, all of which can be referenced at any suitable timeframe. Any such storage options may also be included within the broad term 'memory element' as used herein.

Note that with the examples provided herein, interaction may be described in terms of two, three, or more computing devices. However, this has been done for purposes of clarity and example only. In certain cases, it may be easier to describe one or more of the functionalities of a given set of flows by only referencing a limited number of computing devices. It should be appreciated that computing system 100 and its teachings are readily scalable and can accommodate a large number of components, as well as more complicated/sophisticated arrangements and configurations. Accordingly, the examples provided should not limit the scope or inhibit the broad teachings of computing system 100 as potentially applied to a myriad of other architectures.

It is also important to note that the operations in the preceding flowcharts and interaction diagrams (i.e., FIGS. 3-7) illustrate only some of the possible malicious application blocking activities that may be executed by, or within, computing system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by embodiments of computing system 100 in that any suitable arrangements, chronologies, configurations, and timing mechanisms may be provided without departing from the teachings of the present disclosure.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Although the present disclosure has been described in detail with reference to particular arrangements and configurations, these example configurations and arrangements may be changed significantly without departing from the scope of the present disclosure. Additionally, although computing system 100 has been illustrated with reference to particular elements and operations that facilitate the malicious application blocking activities, these elements and operations may be replaced by any suitable architecture, protocols, and/or processes that achieve the intended functionality of computing system 100.

OTHER NOTES AND EXAMPLES

The following examples pertain to embodiments in accordance with this Specification. Note that all optional features of the apparatuses and systems described above may also be implemented with respect to the method or process described herein and specifics in the examples may be used anywhere in one or more embodiments.

Example N1 is at least one machine readable storage medium encoded with instructions for blocking malware, wherein the instructions, when executed by at least one processor, cause the processor to: receive metadata of a process intercepted on an end host when attempting to access a network, wherein the metadata includes a hash of an application associated with the process and an endpoint reputation score of the application; request a threat intelligence reputation score based on the hash of the application; determine an action to be taken by the end host based, at least in part, on one or more policies and at least one of the threat intelligence reputation score and the endpoint reputation score; and send a response indicating the action to be taken by the end host.

In Example N2, the subject matter of Example N1 can optionally include the action including blocking the application when the threat intelligence reputation score represents at least a certain degree of maliciousness.

In Example N3, the subject matter of Example N2 the instructions, when executed by the at least one processor, further causing the processor to: correlate a tuple of connection information with network traffic associated with a network session established by the process, wherein the metadata includes the tuple of connection information; and if the network security device is in-line with the end host, block, on the network security device, the network traffic correlated to the tuple of connection information.

In Example N4, the subject matter of any one of Examples N2-N3 can optionally include the instructions when executed by the processor further causing the processor to, if the network security device is out-of-band, notify the end host to block on-going network traffic of a network session established by the process.

In Example N5, the subject matter of Example N4 can optionally include the end host being notified to block the on-going network traffic by the response indicating the action to be taken.

In Example N6, the subject matter of Example N1 can optionally include the action including allowing a network session established by the process to continue when the threat intelligence reputation score does not represent at least a certain degree of maliciousness.

In Example N7, the subject matter of Example N6 can optionally include the instructions when executed by the processor further causing the processor to: receive a second endpoint reputation score from the end host; determine a second action to be taken by the end host based, at least in part, on one or more other policies and the second endpoint reputation score; and send a second response indicating the second action to be taken by the end host.

In Example N8, the subject matter of Example N7 can optionally include the second endpoint reputation score being determined based on a heuristic analysis of one or more dynamic link library modules invoked by the process.

In Example N9, the subject matter of Example N8 can optionally include the second action including one of blocking the application and blocking at least one of the one or more dynamic link library modules when the second endpoint reputation score represents at least a certain degree of maliciousness.

In Example N10, the subject matter of Example N6 can optionally include the instructions when executed by the processor further causing the processor to: receive network traffic associated with the network session; detect malware in the network traffic; correlate a tuple of connection information with the network traffic containing the malware, wherein the metadata includes the tuple of connection information; determine a second action to be taken by the end host based, at least in part, on one or more other policies; and send a second response indicating the second action to be taken by the end host.

In Example N11, the subject matter of Example N10 can optionally include the second action including blocking the application.

In Example N12, the subject matter of any one of Examples N1-N11 can optionally include the metadata further including a tuple of connection information, the tuple of connection information including a source network address of the end host, a source port of the end host, a destination network address of a destination node of the network session, a destination port of the destination node, and a protocol of the network session.

In Example N13, the subject matter of any one of Examples N1-N12 can optionally include the metadata further including one or more of a file name of the application, a file path of the application, application reputation information, dynamic link library reputation information, a system identifier, a user identifier, and a domain.

In Example N14, the subject matter of Example N13 can optionally include at least some of the metadata being provided for display on a user interface.

In Example N15, the subject matter of any one of Examples N1-N14 can optionally include the instructions, when executed by the at least one processor, further causing the processor to: request another threat intelligence reputation score based on another hash of a dynamic link library module loaded by the process on the end host, where the action is determined based, at least in part, on the other threat intelligence reputation score.

In Example N16, the subject matter of Example N15 can optionally include the action including blocking the dynamic link library module.

In Example N17, the subject matter of any one of Examples N1-N16 can optionally include, when the threat intelligence reputation score is unavailable, the action to be taken by the end host being determined based on the one or more policies and the endpoint reputation score.

In Example N18, the subject matter of any one of Examples N1-N17 can optionally include the instructions, when executed by the at least one processor, further causing the processor to: compare a threshold limit of the one or more policies to the threat intelligence reputation score to determine the action to be taken.

In Example N19, the subject matter of any one of Examples N1-N18 can optionally include the end host being a virtual desktop of a plurality of virtual desktops managed by a management server, wherein the response is sent to the management server.

Example N20 is an apparatus for blocking malware, the apparatus comprising: at least one memory element; at least one processor coupled to the at least one memory element; an endpoint intelligence server running on the at least one processor, where the endpoint intelligence server is configured to: receive metadata of a process intercepted on an end host when attempting to access a network, wherein the metadata includes a hash of an application associated with the process and an endpoint reputation score of the application; request a threat intelligence reputation score based on the hash of the application; determine an action to be taken by the end host based, at least in part, on one or more policies and at least one of the threat intelligence reputation score and the endpoint reputation score; and send a response indicating the action to be taken by the end host.

In Example N21, the subject matter of Example N20 can optionally include the action including blocking the application when the threat intelligence reputation score represents at least a certain degree of maliciousness.

In Example N22, the subject matter of Example N21 can optionally include the endpoint intelligence server is further configured to: correlate a tuple of connection information with network traffic associated with a network session established by the process, where the metadata includes the tuple of connection information; and if the network security device is in-line with the end host, block, on the network security device, the network traffic correlated to the tuple of connection information.

In Example N23, the subject matter of any one of Examples N21-N22 can optionally include the endpoint intelligence server is further configured to: if the network security device is out-of-band, notify the end host to block on-going network traffic of a network session established by the process.

In Example N24, the subject matter of Example N23 can optionally include the end host being notified to block the on-going network traffic by the response indicating the action to be taken.

In Example N25, the subject matter of Example N20 can optionally include the action including allowing a network session established by the process to continue when the threat intelligence reputation score does not represent at least a certain degree of maliciousness.

In Example N26, the subject matter of Example N25 can optionally include the endpoint intelligence server is further configured to: receive a second endpoint reputation score from the end host; determine a second action to be taken by the end host based, at least in part, on one or more other policies and the second endpoint reputation score; and send a second response indicating the second action to be taken by the end host.

In Example N27, the subject matter of Example N26 can optionally include the second endpoint reputation score being determined based on a heuristic analysis of one or more dynamic link library modules invoked by the process.

In Example N28, the subject matter of Example N27 can optionally include the second action including one of blocking the application and blocking at least one of the one or more dynamic link library modules when the second endpoint reputation score represents at least a certain degree of maliciousness.

In Example N29, the subject matter of Example N25 can optionally include the endpoint intelligence server is further configured to: receive network traffic associated with the network session; detect malware in the network traffic; correlate a tuple of connection information with the network traffic containing the malware, wherein the metadata includes the tuple of connection information; determine a second action to be taken by the end host based, at least in part, on one or more other policies; and send a second response indicating the second action to be taken by the end host.

In Example N30, the subject matter of Example N29 can optionally include the second action including blocking the application.

In Example N31, the subject matter of any one of Examples N20-N30 can optionally include the metadata further including a tuple of connection information, the tuple of connection information including a source network address of the end host, a source port of the end host, a destination network address of a destination node of the network session, a destination port of the destination node, and a protocol of the network session.

In Example N32, the subject matter of any one of Examples N20-N31 can optionally include the metadata further including one or more of a file name of the application, a file path of the application, application reputation information, dynamic link library reputation information, a system identifier, a user identifier, and a domain.

In Example N33, the subject matter of Example N32 can optionally include at least some of the metadata being provided for display on a user interface.

In Example N34, the subject matter of any one of Examples N20-N33 can optionally include the endpoint intelligence agent being further configured to: request another threat intelligence reputation score based on another hash of a dynamic link library module loaded by the process on the end host, where the action is determined based, at least in part, on the other threat intelligence reputation score.

In Example N35, the subject matter of Example N34 can optionally include the action including blocking the dynamic link library module.

In Example N36, the subject matter of any one of Examples N20-N35 can optionally include, when the threat intelligence reputation score is unavailable, the action to be taken by the end host being determined based on the one or more policies and the endpoint reputation score.

In Example N37, the subject matter of any one of Examples N20-N36 can optionally include the endpoint intelligence agent being further configured to: compare a threshold limit of the one or more policies to the threat intelligence reputation score to determine the action to be taken.

In Example N38, the subject matter of any one of Examples N20-N37 can optionally include the end host being a virtual desktop of a plurality of virtual desktops managed by a management server, wherein the response is sent to the management server.

Example N39 is a method for blocking malware, the method comprising: receiving metadata of a process intercepted on an end host when attempting to access a network, wherein the metadata includes a hash of an application associated with the process and an endpoint reputation score of the application; requesting a threat intelligence reputation score based on the hash of the application; determining an action to be taken by the end host based, at least in part, on one or more policies and at least one of the threat intelligence reputation score and the endpoint reputation score; and sending a response indicating the action to be taken by the end host.

In Example N40, the subject matter of Example N39 can optionally include the action including blocking the application when the threat intelligence reputation score represents at least a certain degree of maliciousness.

In Example N41, the subject matter of Example N40 can optionally include correlating a tuple of connection information with network traffic associated with a network session established by the process, wherein the metadata includes the tuple of connection information; and if the network security device is in-line with the end host, blocking, on the network security device, the network traffic correlated to the tuple of connection information.

In Example N42, the subject matter of any one of Examples N40-N41 can optionally include if the network security device is out-of-band, notifying the end host to block on-going network traffic of a network session established by the process.

In Example N43, the subject matter of Example N42 can optionally include the end host being notified to block the on-going network traffic by the response indicating the action to be taken.

In Example N44, the subject matter of Example N39 can optionally include the action including allowing a network session established by the process to continue when the threat intelligence reputation score does not represent at least a certain degree of maliciousness.

In Example N45, the subject matter of Example N44 can optionally include receiving a second endpoint reputation score from the end host; determining a second action to be taken by the end host based, at least in part, on one or more other policies and the second endpoint reputation score; and sending a second response indicating the second action to be taken by the end host.

In Example N46, the subject matter of Example N45 can optionally include the second endpoint reputation score being determined based on a heuristic analysis of one or more dynamic link library modules invoked by the process.

In Example N47, the subject matter of Example N46 can optionally include the second action including one of blocking the application and blocking at least one of the one or more dynamic link library modules when the second endpoint reputation score represents at least a certain degree of maliciousness.

In Example N48, the subject matter of Example N44 can optionally include receiving network traffic associated with the network session; detecting malware in the network traffic; correlating a tuple of connection information with the network traffic containing the malware, where the metadata includes the tuple of connection information; determining a second action to be taken by the end host based, at least in part, on one or more other policies; and sending a second response indicating the second action to be taken by the end host.

In Example N49, the subject matter of Example N48 can optionally include the second action including blocking the application.

In Example N50, the subject matter of any one of Examples N39-N49 can optionally include the metadata further including a tuple of connection information, the tuple of connection information including a source network address of the end host, a source port of the end host, a destination network address of a destination node of the network session, a destination port of the destination node, and a protocol of the network session.

In Example N51, the subject matter of any one of Examples N39-N50 can optionally include the metadata further including one or more of a file name of the application, a file path of the application, application reputation information, dynamic link library reputation information, a system identifier, a user identifier, and a domain.

In Example N52, the subject matter of Example N51 can optionally include at least some of the metadata being provided for display on a user interface.

In Example N53, the subject matter of any one of Examples N39-N52 can optionally include requesting another threat intelligence reputation score based on another hash of a dynamic link library module loaded by the process on the end host, where the action is determined based, at least in part, on the other threat intelligence reputation score.

In Example N54, the subject matter of Example N53 can optionally include the action including blocking the dynamic link library module.

In Example N55, the subject matter of any one of Examples N39-N54 can optionally include, when the threat intelligence reputation score is unavailable, the action to be taken by the end host being determined based on the one or more policies and the endpoint reputation score.

In Example N56, the subject matter of any one of Examples N39-N55 can optionally include comparing a threshold limit of the one or more policies to the threat intelligence reputation score to determine the action to be taken.

In Example N57, the subject matter of any one of Examples N39-N56 can optionally include the end host being a virtual desktop of a plurality of virtual desktops managed by a management server, where the response is sent to the management server.

Example N58 is an apparatus for blocking malware, and the apparatus comprises means for performing the method of any of Examples N39-N57.

In Example N59, the subject matter of Example N58 can optionally include the means for performing the method comprising at least one processor and at least one memory element.

In Example N60, the subject matter of Example N59 can optionally include the at least one memory element comprising machine readable instructions that when executed, cause the apparatus to perform the method of any of Examples N39-N57.

In Example N61, the subject matter of any one of Examples N58-N60 can optionally include the apparatus is a computing system Example N62 includes at least one machine readable storage medium comprising instructions for blocking malware, where the instructions when executed implement a method or realize an apparatus as defined in any of Examples N20-N57.

Example N63 is an apparatus for blocking malware, the apparatus comprising: means for receiving metadata of a process intercepted on an end host when attempting to access a network, wherein the metadata includes a hash of an application associated with the process and an endpoint reputation score of the application; means for requesting a threat intelligence reputation score based on the hash of the application; means for determining an action to be taken by the end host based, at least in part, on one or more policies and at least one of the threat intelligence reputation score and the endpoint reputation score; and means for sending a response indicating the action to be taken by the end host.

Example E1 is at least one machine readable storage medium encoded with instructions for blocking malware, wherein the instructions, when executed by at least one processor, cause the processor to: intercept, on an end host, an attempt to access a network by a process; determine an endpoint reputation score of an application associated with the process; send metadata associated with the process to a network security device, wherein the metadata includes a hash of the application, a tuple of connection information, and the endpoint reputation score; and receive a response indicating an action to be taken, wherein the action is determined based, at least in part, on one or more policies and at least one of a threat intelligence reputation score and the endpoint reputation score.

In Example E2, the subject matter of Example E1 can optionally include the action including blocking the application on the end host when the threat intelligence reputation score represents at least a certain degree of maliciousness.

In Example E3, the subject matter of Example E2 can optionally include the instructions when executed by the processor further causing the processor to: create a rule on the end host to implement the action.

In Example E4, the subject matter of Example E3 can optionally include the rule being implemented to prevent the application from being executed on the end host.

In Example E5, the subject matter of any one of Examples E2-E4 can optionally include the instructions, when executed by the at least one processor, further causing the processor to: block, on the end host when the network security device is out-of-band, on-going network traffic associated with a network session established by the process, wherein the on-going network traffic is blocked based on the tuple of connection information.

In Example E6, the subject matter of Example E1 can optionally include the action including allowing a network session established by the process to continue when the threat intelligence reputation score does not represent at least a certain degree of maliciousness.

In Example E7, the subject matter of Example E6 can optionally include the instructions when executed by the processor further causing the processor to: determine a second endpoint reputation score of the application based on heuristic analysis of a dynamic link library module invoked by the process; and send the second endpoint reputation score to the network security device.

In Example E8, the subject matter of Example E7 can optionally include the instructions when executed by the processor further causing the processor to: receive a second response indicating a second action to block, on the end host, one of the application and the dynamic link library module when the second endpoint reputation score represents at least a certain degree of maliciousness; and create a rule on the end host according to the second action.

In Example E9, the subject matter of Example E7 can optionally include the instructions when executed by the processor further causing the processor to: determine a second action to be taken by the end host based, at least in part, on one or more local host policies and the second endpoint reputation score; create a rule on the end host according to the second action; and send, to network security device, the second endpoint reputation score and second action information indicating the second action to be taken by the end host.

In Example E10, the subject matter of Example E6 can optionally include the instructions when executed by the processor further causing the processor to: receive a second response from the network security device indicating a second action to take on the end host, wherein, when the network security device detects malware in network traffic associated with a network session established by the process, the second action includes blocking the application; and create a rule on the end host according to the second action.

In Example E11, the subject matter of any one of Examples E1-E10 can optionally include the tuple of connection information including a source network address of the end host, a source port of the end host, a destination network address of a remote node of a network session established by the process, and a destination port of the remote node, and a protocol of the network session.

In Example E12, the subject matter of any one of Examples E1-E11 can optionally include the metadata further including one or more of a filename of the application, a file path of the application, application reputation information, dynamic link library reputation information, a system identifier, a user identifier, and a domain.

In Example E13, the subject matter of Example E12 can optionally include at least some of the metadata being displayed on a user interface.

In Example E14, the subject matter of any one of Examples E1-E13 can optionally include the metadata further including the threat intelligence reputation score if the threat intelligence reputation score was previously received in response to a prior attempt to access the network by another process associated with the application.

In Example E15, the subject matter of any one of Examples E1-E14 can optionally include the end host being one of a plurality of virtual personalized desktops running on a virtual device infrastructure server.

Example E16 is an apparatus for blocking malware, the apparatus comprising: at least one memory element; at least one processor coupled to the at least one memory element; an endpoint intelligence agent running on the at least one processor, wherein the endpoint intelligence agent is configured to: intercept an attempt to access a network by a process; determine an endpoint reputation score of an application associated with the process; send metadata associated with the process to a network security device, wherein the metadata includes a hash of the application, a tuple of connection information, and the endpoint reputation score; and receive a response indicating an action to be taken, wherein the action is determined based, at least in part, on one or more policies and at least one of a threat intelligence reputation score and the endpoint reputation score.

In Example E17, the subject matter of Example E16 can optionally include the action includes blocking the application on the apparatus when the threat intelligence reputation score represents at least a certain degree of maliciousness.

In Example E18, the subject matter of Example E17 can optionally include the endpoint intelligence server is further configured to: create a rule to implement the action.

In Example E19, the subject matter of Example E18 can optionally include the rule being implemented to prevent the application from being executed on the end host.

In Example E20, the subject matter of any one of Examples E17-E19 can optionally include the endpoint intelligence server is further configured to: block, on the apparatus when the network security device is out-of-band, on-going network traffic associated with a network session established by the process, wherein the on-going network traffic is blocked based on the tuple of connection information.

In Example E21, the subject matter of Example E16 can optionally include the action including allowing a network session established by the process to continue when the threat intelligence reputation score does not represent at least a certain degree of maliciousness.

In Example E22, the subject matter of Example E21 can optionally include the endpoint intelligence server is further configured to: determine a second endpoint reputation score of the application based on heuristic analysis of a dynamic link library module invoked by the process; and send the second endpoint reputation score to the network security device.

In Example E23, the subject matter of Example E22 can optionally include the endpoint intelligence server is further configured to: receive a second response indicating a second action to block, on the apparatus, one of the application and the dynamic link library module when the second endpoint reputation score represents at least a certain degree of maliciousness; and create a rule on the end host according to the second action.

In Example E24, the subject matter of Example E22 can optionally include the endpoint intelligence server is further configured to: determine a second action to be taken on the apparatus based, at least in part, on one or more local host policies and the second endpoint reputation score; create a rule according to the second action; and send, to network security device, the second endpoint reputation score and second action information indicating the second action to be taken.

In Example E25, the subject matter of Example E21 can optionally include the endpoint intelligence server is further configured to: receive a second response from the network security device indicating a second action to take on the apparatus, wherein, when the network security device detects malware in network traffic associated with a network session established by the process, the second action includes blocking the application; and create a rule according to the second action.

In Example E26, the subject matter of any one of Examples E16-E25 can optionally include the tuple of connection information including a source network address of the apparatus, a source port of the apparatus, a destination network address of a remote node of a network session established by the process, and a destination port of the remote node, and a protocol of the network session.

In Example E27, the subject matter of any one of Examples E16-E26 can optionally include the metadata further including one or more of a filename of the application, a file path of the application, application reputation information, dynamic link library reputation information, a system identifier, a user identifier, and a domain.

In Example E28, the subject matter of Example E27 can optionally include at least some of the metadata being displayed on a user interface.

In Example E29, the subject matter of any one of Examples E16-E28 can optionally include the metadata further including the threat intelligence reputation score if the threat intelligence reputation score was previously received in response to a prior attempt to access the network by another process associated with the application.

In Example E30, the subject matter of any one of Examples E16-E29 can optionally include the apparatus being a virtual device infrastructure server comprising one of a plurality of virtual personalized desktops.

Example E31 is a method for blocking malware, the method comprising: intercepting, on an end host, an attempt to access a network by a process on the end host; determining an endpoint reputation score of an application associated with the process; sending metadata associated with the network access attempt to a network security device, wherein the metadata includes a hash of the application, a tuple of connection information, and the endpoint reputation score; and receiving action information indicating an action to be taken, wherein the action is determined based, at least in part, on one or more policies and at least one of a threat intelligence reputation score and the endpoint reputation score.

In Example E32, the subject matter of Example E31 can optionally include the action including blocking the application on the end host when the threat intelligence reputation score represents at least a certain degree of maliciousness.

In Example E33, the subject matter of Example E32 can optionally include creating a rule on the end host to implement the action.

In Example E34, the subject matter of Example E33 can optionally include the rule being implemented to prevent the application from being executed on the end host.

In Example E35, the subject matter of any one of Examples E32-E34 can optionally include blocking, on the end host when the network security device is out-of-band, on-going network traffic associated with a network session established by the process, wherein the on-going network traffic is blocked based on the tuple of connection information.

In Example E36, the subject matter of Example E31 can optionally include the action including allowing a network session established by the process to continue when the threat intelligence reputation score does not represent at least a certain degree of maliciousness.

In Example E37, the subject matter of Example 36 can optionally include determining a second endpoint reputation score of the application based on heuristic analysis of a dynamic link library module invoked by the process; and sending the second endpoint reputation score to the network security device.

In Example E38, the subject matter of Example E37 can optionally include receiving a second response indicating a second action to block, on the end host, one of the application and the dynamic link library module when the second endpoint reputation score represents at least a certain degree of maliciousness; and creating a rule on the end host according to the second action.

In Example E39, the subject matter of Example E37 can optionally include determining a second action to be taken by the end host based, at least in part, on one or more local host policies and the second endpoint reputation score; creating a rule on the end host according to the second action; and sending, to network security device, the second endpoint reputation score and second action information indicating the second action to be taken by the end host.

In Example E40, the subject matter of Example E36 can optionally include receiving a second response from the network security device indicating a second action to take on the end host, wherein, when the network security device detects malware in network traffic associated with a network session established by the process, the second action includes blocking the application; and creating a rule on the end host according to the second action.

In Example E41, the subject matter of any one of Examples E31-E40 can optionally include the tuple of connection information including a source network address of the end host, a source port of the end host, a destination network address of a remote node of a network session established by the process, and a destination port of the remote node, and a protocol of the network session.

In Example E42, the subject matter of any one of Examples E31-E41 can optionally include the metadata further including one or more of a filename of the application, a file path of the application, application reputation information, dynamic link library reputation information, a system identifier, a user identifier, and a domain.

In Example E43, the subject matter of Example E42 can optionally include at least some of the metadata being displayed on a user interface.

In Example E44, the subject matter of any one of Examples E31-E43 can optionally include the metadata further including the threat intelligence reputation score if the threat intelligence reputation score was previously received in response to a prior attempt to access the network by another process associated with the application.

In Example E45, the subject matter of any one of Examples E31-E44 can optionally include the end host being one of a plurality of virtual personalized desktops running on a virtual device infrastructure server.

Example E46 is an apparatus for blocking malware, the apparatus comprising means for performing the method of any of Examples E31-E45.

In Example E47, the subject matter of Example E46 can optionally include the means for performing the method comprising at least one processor and at least one memory element.

In Example E48, the subject matter of Example E47 can optionally include the at least one memory element comprising machine readable instructions that when executed, cause the apparatus to perform the method of any of Examples E31-E45.

In Example E49, the subject matter of any of Examples E46-E48 can optionally include the apparatus being a computing system.

Example E50 is at least one machine readable storage medium comprising instructions for blocking malware, where the instructions when executed implement a method or realize an apparatus as defined in any of Examples E16-E45.

Example E51 is an apparatus for blocking malware, the apparatus comprising: means for intercepting, on an end host, an attempt to access a network by a process on the end host; means for determining an endpoint reputation score of an application associated with the process; means for sending metadata associated with the network access attempt to a network security device, wherein the metadata includes a hash of the application, a tuple of connection information, and the endpoint reputation score; and means for receiving action information indicating an action to be taken, wherein the action is determined based, at least in part, on one or more policies and at least one of a threat intelligence reputation score and the endpoint reputation score.

What is claimed is:

1. At least one non-transitory machine readable storage medium encoded with instructions for blocking malware, wherein the instructions, when executed by at least one processor cause the processor to:
    intercept, on an end host, an attempt to access a network by a process;
    determine, by the end host, an endpoint reputation score of an application associated with the process, wherein the endpoint reputation score indicates a degree of maliciousness of the application;
    send metadata associated with the process to a network security device, wherein the metadata includes a hash of the application, a tuple of connection information, and the endpoint reputation score; and
    receive a response indicating an action to be taken, wherein the action is determined based, at least in part, on one or more policies and at least one of a threat intelligence reputation score and the endpoint reputation score, and wherein, if the action includes allowing a network session established by the process to continue, monitor, by the end host, the network session to identify a dynamic link library (DLL) invoked by the application that indicates some degree of maliciousness based on activities performed by the DLL for the application.

2. The at least one non-transitory machine readable storage medium of claim 1, wherein the action includes blocking the application on the end host based on the threat intelligence reputation score representing at least a certain degree of maliciousness.

3. The at least one non-transitory machine readable storage medium of claim 2, wherein the instructions, when executed by the processor, further cause the processor to:
create a rule on the end host to implement the action.

4. The at least one non-transitory machine readable storage medium of claim 3, wherein the rule is implemented to prevent the application from being executed on the end host.

5. The at least one non-transitory machine readable storage medium of claim 2, wherein the application is blocked on the end host based on the network security device being out-of-band.

6. The at least one non-transitory machine readable storage medium of claim 1, wherein the action includes allowing a network session established by the process to continue based on determining the threat intelligence reputation score does not represent at least a certain degree of maliciousness.

7. The at least one non-transitory machine readable storage medium of claim 6, wherein the instructions, when executed by the at least one processor, further cause the processor to:
determine, by the end host, a second endpoint reputation score of the application based, at least in part, on heuristic analysis of a dynamic link library (DLL) module invoked by the process; and
send the second endpoint reputation score to the network security device.

8. The at least one non-transitory machine readable storage medium of claim 7, wherein the instructions, when executed by the at least one processor, further cause the processor to:
receive a second response indicating a second action to block, on the end host, at least one of the application and the DLL module when the second endpoint reputation score represents at least a certain degree of maliciousness; and
create a rule on the end host according to the second action.

9. The at least one non-transitory machine readable storage medium of claim 7, wherein the instructions, when executed by the at least one processor, further cause the processor to:
determine a second action to be taken by the end host based, at least in part, on one or more local host policies and the second endpoint reputation score;
create a rule on the end host according to the second action; and
send, to network security device, the second endpoint reputation score and second action information indicating the second action to be taken by the end host.

10. The at least one non-transitory machine readable storage medium of claim 1, wherein the instructions when executed further cause the processor to:
receive a second response from the network security device indicating a second action to take on the end host, wherein the second action includes blocking the application based on the network security device detecting malware in network traffic associated with a network session established by the process; and
create a rule on the end host according to the second action.

11. The at least one non-transitory machine readable storage medium of claim 1, wherein the tuple of connection information includes a source network address of the end host, a source port of the end host, a destination network address of a remote node of a network session established by the process, a destination port of the remote node, and a protocol of the network session.

12. The at least one non-transitory machine readable storage medium of claim 1, wherein the metadata further includes at least one of a filename of the application, a file path of the application, application reputation information, dynamic link library reputation information, a system identifier, a user identifier, and a domain.

13. The at least one non-transitory machine readable storage medium of claim 1, wherein the metadata further includes the threat intelligence reputation score if the threat intelligence reputation score was previously received based on a prior attempt to access the network by another process associated with the application.

14. The at least one non-transitory machine readable storage medium of claim 1, wherein the end host is one of a plurality of virtual personalized desktops running on a virtual device infrastructure server.

15. An apparatus for blocking malware, the apparatus comprising:
at least one processor coupled to at least one memory element;
an endpoint intelligence agent configured to run on the at least one processor to:
intercept an attempt to access a network by a process;
determine an endpoint reputation score of an application associated with the process, wherein the endpoint reputation score indicates a degree of maliciousness of the application;
send metadata associated with the process to a network security device, wherein the metadata includes a hash of the application and the endpoint reputation score; and
receive a response indicating an action to be taken, wherein the action is determined based, at least in part, on one or more policies and at least one of a threat intelligence reputation score and the endpoint reputation score, and wherein, if the action includes allowing a network session established by the process to continue, monitor, by the end host, the network session to identify a dynamic link library (DLL) invoked by the application that indicates some degree of maliciousness based on activities performed by the DLL for the application.

16. The apparatus of claim 15, wherein the action includes blocking the application on the apparatus based on the threat intelligence reputation score representing at least a certain degree of maliciousness.

17. The apparatus of claim 15, wherein the action includes allowing a network session established by the process to continue based on determining the threat intelligence reputation score does not represent at least a certain degree of maliciousness.

18. The apparatus of claim 17, wherein the endpoint intelligence agent is further configured to run on the at least one processor to:
determine a second endpoint reputation score of the application based, at least in part, on heuristic analysis of a dynamic link library (DLL) module invoked by the process; and
send the second endpoint reputation score to the network security device.

19. The apparatus of claim 18, wherein the endpoint intelligence agent is further configured to run on the at least one processor to:

receive a second response from the network security device indicating a second action to take on the apparatus, the second action including blocking at least one of the application and the dynamic link library module based on the second endpoint reputation score representing at least the certain degree of maliciousness; and create a rule on the apparatus according to the second action.

20. The apparatus of claim 15, wherein the endpoint intelligence agent is further configured to run on the at least one processor to:

take another action based on determining a dynamic link library (DLL) invoked by the application indicates a certain degree of maliciousness.

21. A method for blocking malware, the method comprising:

intercepting, on an end host, an attempt to access a network by a process on the end host;

determining, by the end host, an endpoint reputation score of an application associated with the process, wherein the endpoint reputation score indicates a degree of maliciousness of the application;

sending metadata associated with the network access attempt to a network security device, wherein the metadata includes a hash of the application and the endpoint reputation score; and receiving a response indicating an action to be taken, wherein the action is determined based, at least in part, on one or more policies and at least one of a threat intelligence reputation score and the endpoint reputation score, and wherein, if the action includes allowing a network session established by the process to continue, monitor, by the end host, the network session to identify a dynamic link library (DLL) invoked by the application that indicates some degree of maliciousness based on activities performed by the DLL for the application.

22. The method of claim 21, wherein the action includes blocking the application on the end host based on the threat intelligence reputation score representing at least a certain degree of maliciousness.

23. A system for blocking malware, the system comprising:

first logic at least partially including hardware logic on an end host, the first logic to:

intercept an attempt to access a network by a process running on the end host;

determine, by the end host, an endpoint reputation score of an application associated with the process, wherein the endpoint reputation score indicates a degree of maliciousness of the application; and send metadata associated with the network access attempt to a network security device, the metadata including a hash of the application and the endpoint reputation score; and second logic on the network security device, the second logic to:

request a threat intelligence reputation score based on the hash of the application;

determine an action to be taken by the end host based, at least in part, on one or more policies and at least one of the threat intelligence reputation score and the endpoint reputation score, and wherein, if the action includes allowing a network session established by the process to continue, monitor, by the end host, the network session to identify a dynamic link library (DLL) invoked by the application that indicates some degree of maliciousness based on activities performed by the DLL for the application; and send a response to the end host, the response indicating the action to be taken.

24. The system of claim 23, wherein the first logic is to:

take another action based on determining a dynamic link library (DLL) invoked by the application indicates a certain degree of maliciousness.

* * * * *